United States Patent
Narin et al.

(10) Patent No.: US 8,014,303 B2
(45) Date of Patent: Sep. 6, 2011

(54) SYSTEMS AND METHODS FOR INTERFACING WITH NETWORK INFORMATION COLLECTION DEVICES

(75) Inventors: Dogu Narin, Sunnyvale, CA (US); Siobhan Tully, Windham, NH (US); David Payne, Haverhill, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/980,578

(22) Filed: Dec. 29, 2010

(65) Prior Publication Data

US 2011/0099257 A1  Apr. 28, 2011

Related U.S. Application Data

(63) Continuation of application No. 12/196,493, filed on Aug. 22, 2008, now Pat. No. 7,885,194.

(51) Int. Cl.
*H04L 12/26* (2006.01)
(52) U.S. Cl. ......... 370/242; 370/244; 370/245; 370/252
(58) Field of Classification Search .................. 370/242, 370/244, 245, 250, 251, 252
See application file for complete search history.

(56) References Cited

U.S. PATENT DOCUMENTS

| | | | |
|---|---|---|---|
| 6,003,074 A | 12/1999 | Vasconcellos |
| 6,167,358 A | 12/2000 | Othmer et al. |
| 6,556,659 B1 | 4/2003 | Bowman-Amuah |
| 7,266,734 B2 | 9/2007 | Chavez et al. |
| 7,296,070 B2 | 11/2007 | Sweeney et al. |
| 7,609,647 B2 | 10/2009 | Turk et al. |
| 7,885,194 B1 | 2/2011 | Narin et al. |
| 2005/0097405 A1 | 5/2005 | Sesek et al. |
| 2007/0003023 A1 | 1/2007 | Rolia et al. |
| 2009/0157903 A1 | 6/2009 | Lewis et al. |

OTHER PUBLICATIONS

Co-pending U.S. Appl. No. 12/196,493, filed Aug. 22, 2008 entitled "Systems and Methods for Interfacing With Network Information Collection Devices" by Dogu Narin et al., 59 pages.

*Primary Examiner* — Hassan Kizou
*Assistant Examiner* — Toan Nguyen
(74) *Attorney, Agent, or Firm* — Harrity & Harrity, LLP

(57) ABSTRACT

A network device may include logic configured to receive a problem report from a second network device, where the problem report includes event data, determine at least one of an action to perform or whether reconfiguration information is associated with the event data in the received problem report and add information to the received problem report to provide a reformatted problem report and transmit the reformatted problem report to a third network device when it is determined that reconfiguration information is not associated with the event data in the problem report.

20 Claims, 14 Drawing Sheets

310

SYSTEMS AND METHODS FOR INTERFACING WITH NETWORK INFORMATION COLLECTION DEVICES

RELATED APPLICATION

This application is a continuation of U.S. patent application Ser. No. 12/196,493, filed Aug. 22, 2008, now U.S. Pat. No. 7,885,194, which is incorporated herein by reference.

BACKGROUND INFORMATION

Event detection and management systems typically store conditions that, when satisfied, generate error messages within a network device. The error messages, such as an alert indicating a possible error, may be sent as a message to a remote location in another network. In many cases, the remote location in the other network is operated by a managed service provider. Network operators of the managed service provider commonly do not have adequate knowledge of processes within network devices because the managed service providers generally do not manufacture the network devices. Further, there may be insufficient information included in the error message to guide a network operator. Thus, network operators of the managed service providers may be alerted to errors, but the network devices may remain in failed states as network operators can not reconfigure the network devices to correct the errors.

SUMMARY

According to one aspect, a network device may include logic configured to receive a problem report from a second network device, where the problem report includes event data; determine at least one of an action to perform or whether reconfiguration information is associated with the event data in the received problem report; and add information to the received problem report to provide a reformatted problem report and transmit the reformatted problem report to a third network device when it is determined that reconfiguration information is not associated with the event data in the problem report.

According to one aspect, method may be provided. The method may include receiving a problem report from a first network device, where the problem report includes a type of event data; storing and associating at least one of an action or an alert with each type of event data; forming a second problem report from the first problem report, where the second problem report includes the type of event data from the first report and at least one of an action or an alert associated with the type of event data from the first problem report; and transmitting the second problem report to a second network device.

According to yet another aspect, a network device may be provided. The network device comprising means for receiving a first problem report from a downstream network device; means for identifying events included in the first problem report; means for storing and associating at least one of reconfiguration information, an action, or an alert with an identified event included in the first problem report; means for forming a second problem report, where the second problem report includes the identified event from the first problem report and at least one of the reconfiguration information, an action, or an alert associated with the identified event; means for transmitting the second problem report that includes one of an action or an alert to an upstream network device when there is no reconfiguration information associated with the identified event included in the second problem report; and means for transmitting the second problem report to the downstream network device when there is reconfiguration information associated with the identified event included in the second problem report.

DETAILED DESCRIPTION OF PREFERRED EMBODIMENTS

The following detailed description refers to the accompanying drawings. The same reference numbers in different drawings may identify the same or similar elements.

Embodiments described herein may allow errors and/or events within network devices or elements to be detected, bundled with data in an XML event problem report bundle, and transmitted upstream to an information collection gateway. The information collection gateway may determine if reconfiguration information is associated with an event contained in the received XML event problem report bundle and may transmit the reconfiguration information to the network element from which the XML event problem report bundle was received. The information collection gateway may also reformat the XML event problem report bundle to include actions and alerts to the next upstream device (another information collection gateway or backend network device) for further processing when it is determined that there is no reconfiguration information associated with the event included in the problem report. A backend network device may further process event and/or error data in order to create reconfiguration information to correct the event and/or error that occurred in a network element. The reconfiguration information may be obtained from the backend network device by the information collection gateway, and may be transmitted downstream to other information collection gateways and to the network element.

While some of the following description is provided mainly in the context of routers or other network devices or elements at layer 2 and/or layer 3 of the Open Systems Interconnection (OSI) Model, the principles and teachings may be applied to different types of network devices at different layers of communication (e.g., Multi-protocol label switching (MPLS) routers, a Synchronous Optical Network (SONET) add-drop multiplexers, a Gigabit Passive Optical network (GPONs) switches, a Synchronous Digital Hierarchy (SDH) network elements, etc.).

Figure 1:
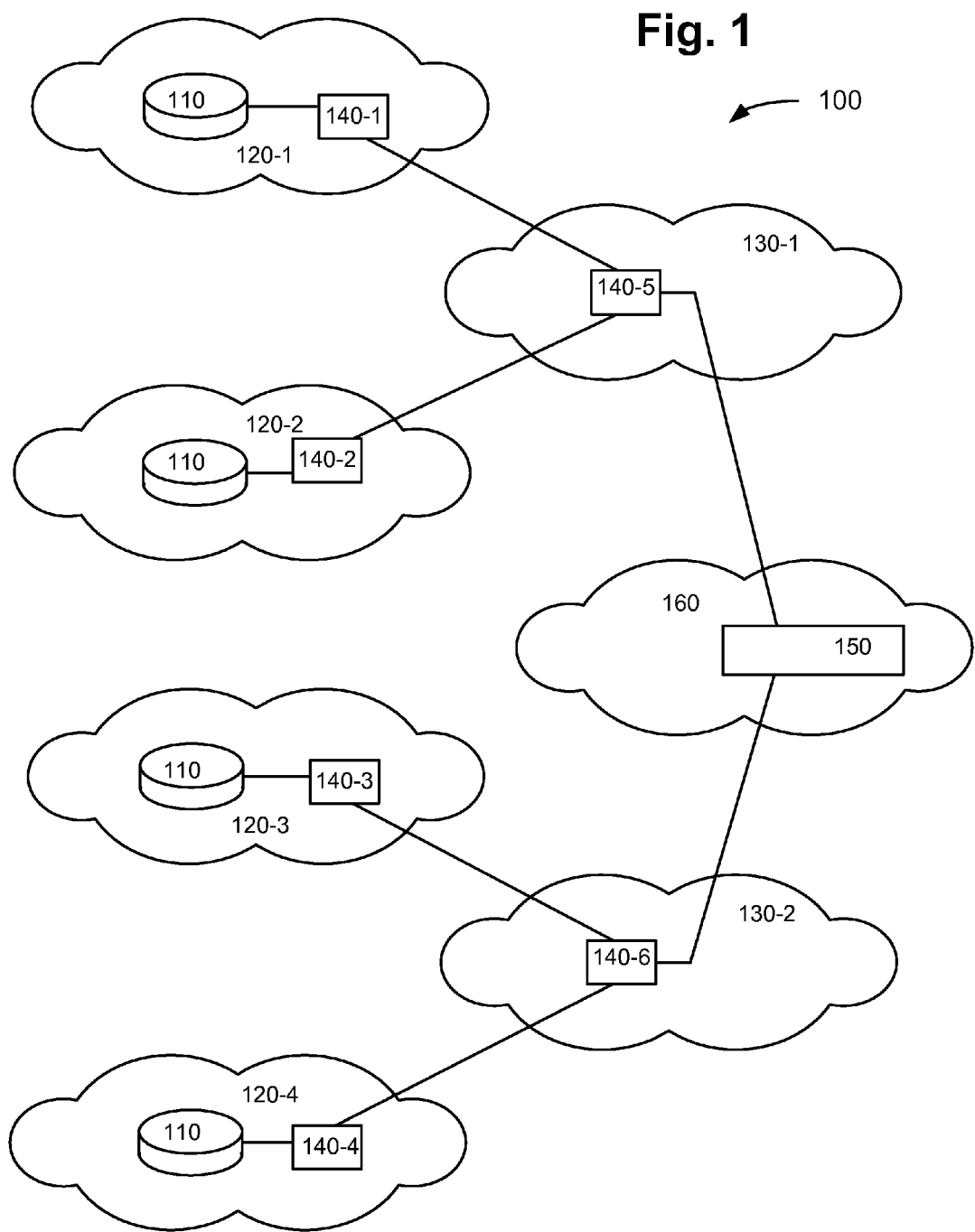
FIG. 1 shows an exemplary network configuration in which concepts described herein may be implemented.

FIG. 1 depicts an exemplary network configuration in which concepts described herein may be implemented. As shown in FIG. 1, a network 100 may include a number of network elements 110, networks 120-1 to 120-4, managing service provider networks 130-1 and 130-2, information collection gateways (ICGs) 140-1 to 140-6, backend network device (BND) 150, and backend network 160. In practice, network 100 may include fewer, different, or additional elements than those illustrated in FIG. 1.

Network elements 110 may include one or more devices for performing network-related functions (e.g., a router, a switch (e.g., a provider edge (PE) router in a MPLS network), etc.).

Networks 120-1 to 120-4 may include the Internet, an ad hoc network, a local area network (LAN), a wide area network (WAN), a metropolitan area network (MAN), a cellular network, a public switched telephone network (PSTN), any other network, and/or a combination of networks. In one example, networks 120-1 to 120-4 may be independent networks owned and operated by two separate companies. In this example, "company A" may own networks 120-1 and 120-2, "company B" may own network 120-3, and "company C" may own network 120-4.

Managing service provider networks 130-1 and 130-2 may include an ad hoc network, a local area network (LAN), a wide area network (WAN), a metropolitan area network (MAN), a cellular network, a public switched telephone network (PSTN), any other network, and/or a combination of networks. In this example, managing service provider network 130-1 may be owned by "company D," where "company D" may be employed or contracted by "company A" to manage and provide service for networks 120-1 and 120-2. Similarly, "company E" may also be employed or contracted by "company B" and "company C" to mange and provide services for networks 120-3 and 120-4 respectively.

Information collection gateways (ICGs) 140-1 to 140-6 may include one or more devices for performing network-related functions, such as transmission and/or reception of network information to/from network elements 110, another ICG 140 and/or backend network device 150. ICGs 140-1 to 140-6 may be configured similarly, and/or may be referred to collectively as ICGs 140.

Backend network device BND 150 may include one or more devices that receive network information from ICGs 140-5 and 140-6, analyze received network information, and/or transmit reconfiguration information to ICGs 140-5 and 140-6 based on the analyzed network information.

Backend network 160 may include a local area network (LAN) or a wide area network (WAN), any other network, and/or a combination of networks. In one example, backend network 160 may be owned and operated by "company F," that may be a manufacturer and/or vendor of the network elements 110.

Network elements 110, ICGs 140-1 to 140-6, and/or BND 150 may communicate with each other via wired or wireless communication links provided by networks 120-1 to 120-4, 130-1 to 130-2 and/or backend network 160.

Although FIG. 1 shows exemplary components of network 100, in other implementations, network 100 may contain fewer, different, or additional components than depicted in FIG. 1. In still other implementations, one or more components of network 100 may perform one or more of the tasks described as being performed by one or more other components of network 100.

Figure 2:
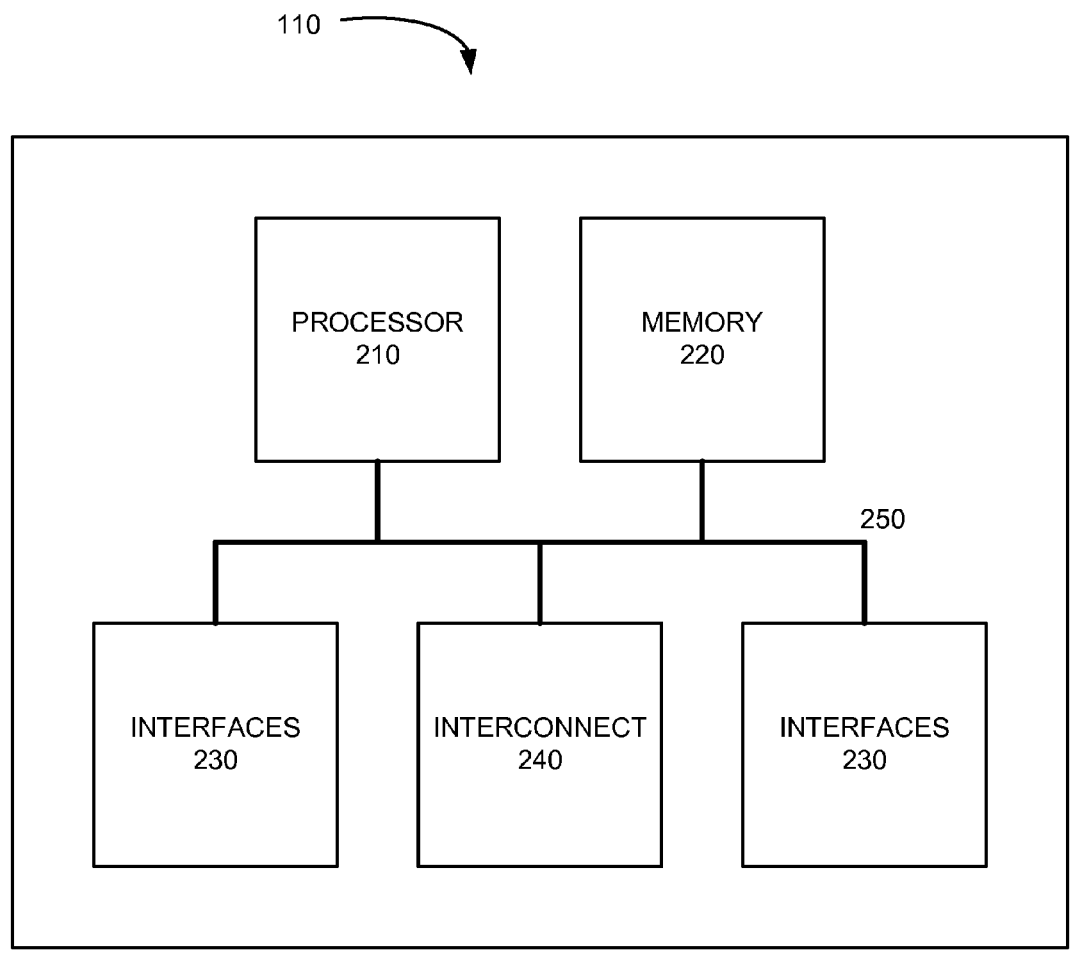
FIG. 2 is a block diagram of an exemplary network device of FIG. 1.

FIG. 2 shows an exemplary block diagram of exemplary components of one of network elements 110. As shown, a network element 110 may include a processor 210, a memory 220, interfaces 230, an interconnect 240, and a bus 250. In other implementations, network element 110 may include fewer, additional, or different components than those illustrated in FIG. 2.

Processor 210 may include one or more processors, microprocessors, application specific integrated circuits (ASICs), field programming gate arrays (FPGAs), and/or processing logic optimized for networking and communications.

Memory 220 may include static memory, such as read only memory (ROM), dynamic memory, such as random access memory (RAM), and/or onboard cache, for storing data and machine-readable instructions. Memory 220 may also include storage devices, such as a floppy disk, a CD ROM, a CD read/write (R/W) disc, and/or flash memory, as well as other types of storage devices.

Interfaces 230 may include one or more devices for receiving incoming data streams from networks and/or for transmitting data to networks. For example, interfaces 230 may include Ethernet cards, optical carrier (OC) interfaces, asynchronous transfer mode (ATM) interfaces, etc.

Interconnect 240 may include one or more switches or switch fabrics for directing incoming network traffic from one of interfaces 230 to another one of interfaces 230.

Bus 250 may include a path that permits communication among processor 210, memory 220, interfaces 230, and/or interconnects 240.

The components depicted in FIG. 2 may provide fewer or additional functionalities. For example, if network element 110 performs an Internet Protocol (IP) packet routing function as part of a Multi-Protocol Label Switching (MPLS) router, processor 210 may perform tasks associated with obtaining routing information from other routers in a MPLS network. In such cases, conveying network traffic from one of interfaces 230 to another one of interfaces 230 may involve label based routing, rather than IP address based routing.

Figure 3:
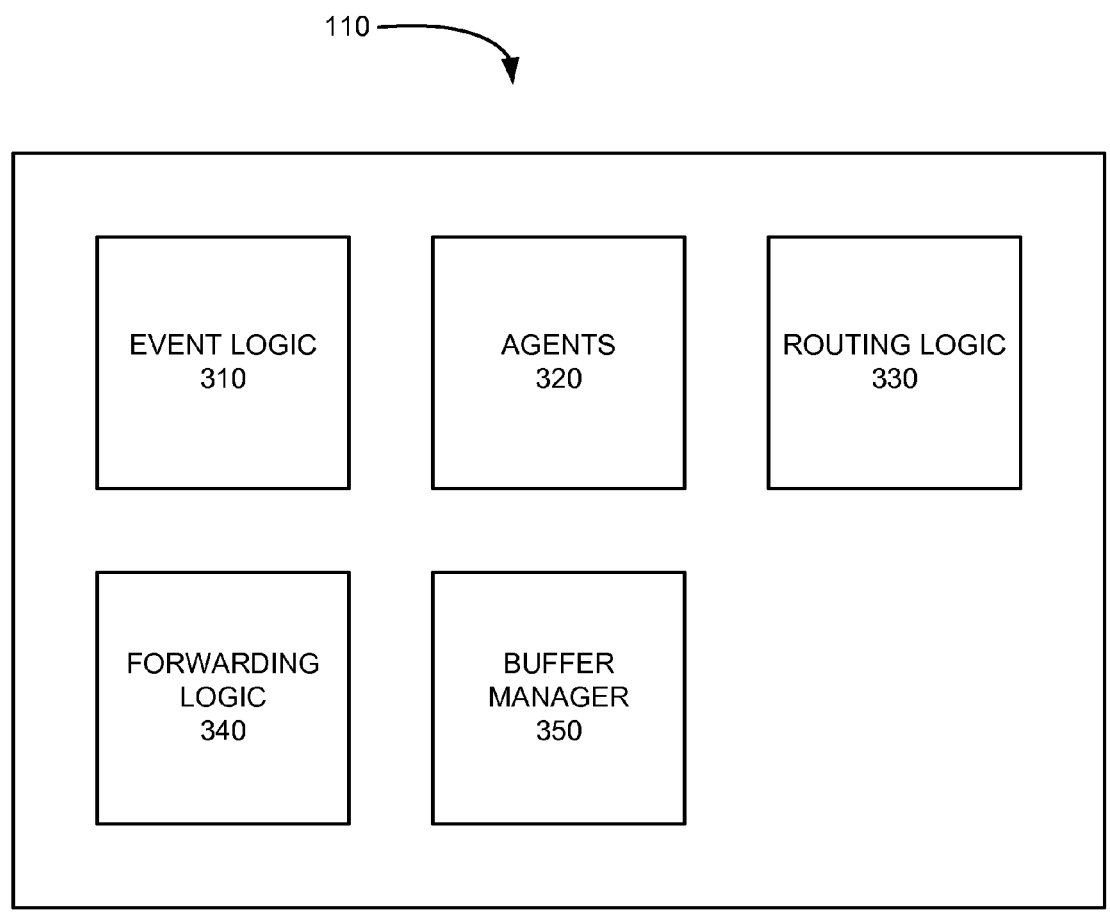
FIG. 3 is a functional block diagram of the network device of FIGS. 1 and 2.

FIG. 3 is a block diagram depicting exemplary functional components of one of network elements 110. As shown, network element 110 may include event logic 310, agents 320, routing logic 330, forwarding logic 340, and/or buffer manager 350. In other implementations, network element 110 may include fewer, additional, or different components than those illustrated in FIG. 3. For example, network element 110 may or may not provide certain network management functions, and in such instances, network element 110 may not include certain agents 320.

Event logic 310 may include hardware and/or software-based logic for performing various event-driven functions for management and operation of network element 110. Event logic 310 may create and transmit an XML event problem report bundle, based on a detected event, to other network elements 110. For example, event logic 310 may provide embedded reactive and proactive scripts used to collect and analyze data to monitor performance within network element 110. Event logic 310 may correlate events and/or time periods, and, in response to the analysis of correlated events/time periods, may make decisions to reconfigure operations of network element 110. Event logic 310 may provide an interface that may transmit and/or receive XML event problem report bundles to/from another network device (such as another network element 110 and/or ICG 140). Additional information about event logic 310 is provided below in connection with FIG. 4.

Agents 320 may include hardware and/or software-based logic for monitoring and/or controlling components on behalf of event logic 310. The monitored components may include a physical device (e.g., a plug-in card, a multiplexer, a switch, etc.) or a logical device (e.g., a virtual connection or a logical interface). When monitoring the components, agents 320 may detect a fault and/or a recovery of an interface, an interconnect, and/or any other component of network element 110, and/or may report the fault and/or the recovery to event logic 310. For example, agents 320 may detect a failure of one of interfaces 230, and/or may send associated alarms and/or error messages to event logic 310. In another example, agents 320 may receive commands from a remote device, and/or may make appropriate configuration changes to interfaces 230. In other implementations, agents 320 may be attached and/or connected to other subcomponents of network element 110.

Routing logic 330 may include hardware and/or software-based logic for communicating with other routers to gather and/or store routing information in a routing information base (RIB).

Forwarding logic 340 may include hardware and/or software-based logic for directing a packet to a proper output port on one of interfaces 230 based on routing information in the RIB.

Buffer manager 350 may include a buffer for queuing incoming packets. If packets arrive simultaneously, one or more of the packets may be stored in the buffer until higher priority packets are processed and/or transmitted.

Figure 4:
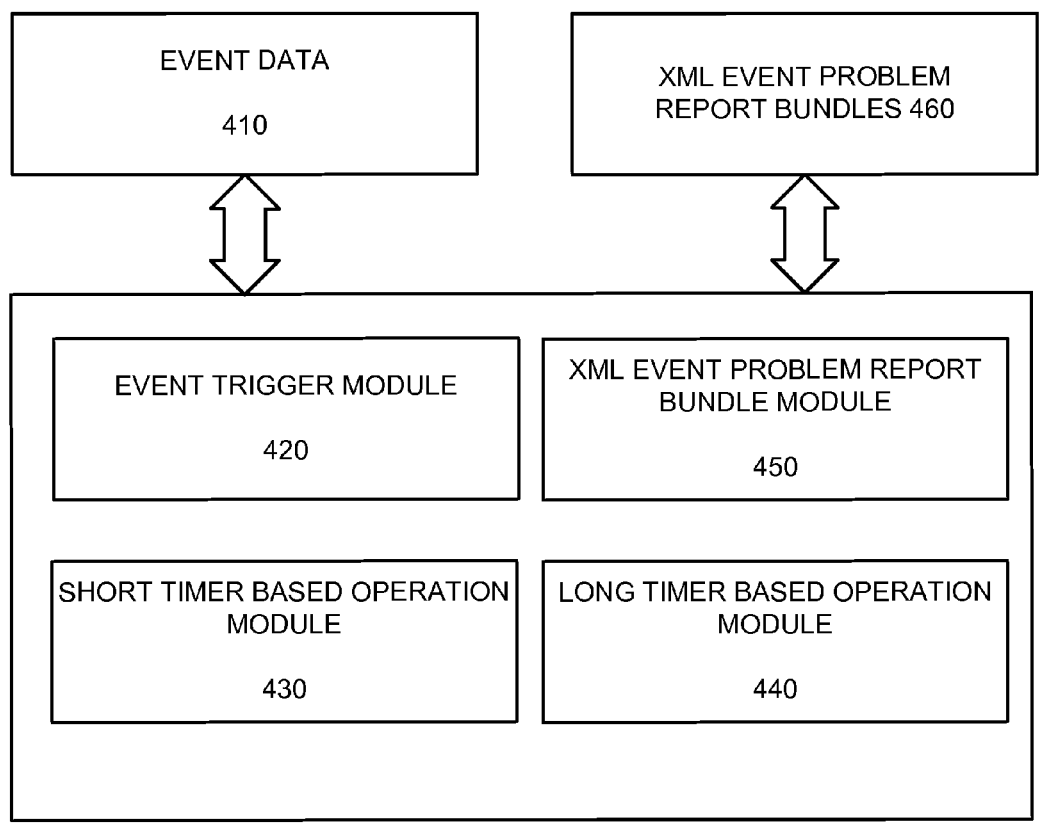
FIG. 4 is a functional block diagram of the event logic of FIG. 3.

FIG. 4 depicts a block diagram of exemplary functional components of event logic 310. As shown, event logic 310 may include an event trigger module 420, a short timer-based operation module 430, a long timer-based operation module 440 and an XML event problem report bundle module 450. As further shown in FIG. 4, event logic 310 may transmit and/or receive event data 410 and/or XML event problem report bundles 460. In different implementations, event logic 310 may include fewer, additional, or different components than those illustrated in FIG. 4.

Event data 410 may include information related to events and/or the status of hardware and software contained within network element 110. For example, the components shown in FIG. 2, such as processor 210, memory 220, interfaces 230, and/or interconnect 240, may provide signals and information identifying certain events. For example, processor 210 may provide event data 410 that includes information relating to the status of internal registers becoming overloaded and/or unused. The functional components shown in FIG. 3 may provide event data 410 that includes information related to status and/or events. For example, routing logic 330 may provide event data 410 that includes information indicating a processing failure regarding the routing information base (RIB).

Event trigger module 420 may include hardware and/or software-based logic that may receive a signal from XML event problem report bundle module 450, and may invoke a script. For example, a process may be contained within a script that may identify a hardware or software problem, collect data relating to the identified problem, perform an analysis of the collected data, perform a corrective action based on the analysis, and/or send the collected data to XML event problem report bundle module 450. The analysis performed by an invoked script within event trigger module 420 may include any appropriate analysis algorithm, such as, for example, a decision tree or an artificial intelligence database. The specific type of analysis performed by each script may be determined by the specific event/policy that invoked the script. For example, if event data 410 contains information that a particular component of network element 110 is using 90% of processor resources, a script contained in event trigger module 420 may be invoked by XML event problem report bundle module 450 to collect data and to determine what component is using the resources, what is the nature of the problem, and/or what, if any, corrective actions may be taken. Scripts invoked by event trigger module 420 may be referred to as "reactive" scripts, as these scripts may be invoked to react to a received event.

Short timer-based operation module 430 may include hardware and/or software-based logic that may receive a signal from XML event problem report bundle module 450, and/or may invoke a script. For example, upon detection of an event and/or short timer value expiring, XML event problem report bundle module 450 may invoke a script contained in short timer based operations module 430. Scripts contained in short timer-based operation module 430 may identify a hardware and/or software problem, collect data relating to the identified problem, perform an analysis of the collected data, perform a corrective action based on the analysis, and/or send collected data to XML event problem report bundle module 450. The analysis performed by an invoked script within short timer based operation module 430 may include any appropriate analysis algorithm such as, for example, a decision tree or an artificial intelligence database. The specific type of analysis performed by each script may be determined by a specific short timer value that may have expired within XML event problem report bundle module 450. Scripts invoked by short timer-based operation module 430 may also be referred to as "reactive" scripts, as they may be invoked to react to expiration of a short timer value.

Long timer-based operation module 440 may include hardware and/or software based logic that may receive a signal from XML event problem report bundle module 450, and/or may invoke a script. For example, upon detection of an event or long timer value expiring, XML event problem report bundle module 450 may invoke a script contained in long timer-based operation module 440. For example, a script contained in long timer based operation module 440 may collect data, and/or may transmit the collected data to XML event problem report bundle module 450 to create XML event problem report bundles 460. XML event problem report bundles 460 may be transmitted to another network device to be analyzed to determine long term trends of network element 110. Data collected by a script invoked by long timer based operation module 440 may be strategically analyzed (e.g., by BND 150) to determine potential risks and/or failures that may occur within network element 110. Scripts invoked by long timer-based operation module 440 may be referred to as proactive scripts, as the data collected and analyzed may relate to successful operations of network element 110, and may be used to "proactively" reconfigure hardware and/or software within network element 110 before a problem and/or error occurs.

XML event problem report bundle module 450 may include event policies and/or time periods that may be used to process received event data 410, and, in response to the received event, time period, etc, to invoke scripts contained in modules 420-440. For example, XML event problem report bundle module 450 may store events and/or information relating to an appropriate script and/or module 420-440 to invoke. After determining an appropriate script to invoke, XML event problem report bundle module 450 may send signals and/or information to the appropriate module (e.g., modules 420-440) so that further processing of data may be performed. XML event problem report bundle module 450 may receive data collected by the scripts invoked (e.g., by modules 420-440), and/or may form XML event problem report bundles 460 with the collected data. For example, XML event problem report bundle module 450 may store XML document structures, parameters, and/or tagged fields relating to all the types of events, short time periods, and/or long time periods that may be detected. Each event and/or time period may be associated with an appropriate XML document and/or file structure that may include XML header information and/or XML payload information. In one example, XML event problem report bundle module 450 may receive data collected from a script contained in event trigger module 420 that relates to a detected interface failure. This collected data may be received by XML event problem report bundle module 450, and/or an appropriate XML file header may be determined based on the invoked script. Based on the parameters contained in the XML header file, specific XML payload files may be determined. Using the data received from the script, XML event problem report bundle module 450 may tag the data in order to generate the XML header file and/or corresponding XML payload files. XML event problem report bundle module 450 may bundle the XML header file and/or corresponding XML payload files for transmission to ICG 140 and to BND 150 as XML event problem report bundles 460.

XML event problem report bundles 460 may include an XML header file and/or XML payload files that contain data and/or information collected by scripts contained in modules 420-440. For example, data contained in an XML header file may include an event that invoked a script and information related to the event. The events and information related to the event may be contained in XML tagged fields used to describe and/or label information in the XML header file. For example, events may include a hardware failure, a software failure, a high temperature sensor reading, etc. The information related to the event may be included in the XML header file in tagged fields, such as, for example, host-event ID, service type, problem class, problem description, priority severity, problem priority, core file path, product name, host name, version information, time of event, core manifest, software stack trace, show chassis hardware, show chassis firmware, and/or problem synopsis. Using these exemplary events and fields, information contained in an XML header file may be identified and/or accessed by a recipient (e.g. ICG 140 and/or BND 150) of an XML event problem report bundle 460.

XML payload files included in an XML event problem report bundle 460 may include information in tagged fields. XML payload files may include sections such as a configuration section, a trend section, and/or attachments. The specific XML payload file sections may be determined by the event and related fields identified in the XML header file. For example, if an event is a hardware failure, specific tagged fields may be included in the XML payload files that provide information relating to the hardware failure. If, for example, the event is a software error, specific tagged fields may be included in the XML payload files that provide information relating to the software error. Examples of tagged fields included in the trend section of the XML payload files may include fields, such as routing engine, show chassis routing engine, flexible PIC connector (FPC), show chassis FPC (brief), show chassis FPC (detail), show nhbd zones (T-series), show nhbd zones (M-series), show bchip ucode bind (M-series), packet forwarding engine (PFE), show PFE statistics traffic, system, show system buffers, show system processes extensive, show system uptime, (SCB), show chassis SCB, show chassis (feb), show chassis smf (brief), show chassis smf (detail), show chassis forwarding, etc. Using descriptive payload fields, information contained in XML payload files may be easily identified and/or accessed by a recipient of a XML problem report bundle 460.

In addition to files containing tagged fields of information, the XML payload files may include attachment files that may not include tagged fields of information. For example, an exemplary attachment file may include numerical data relating to memory statistics by size, memory statistics by type, and/or other text information relating to memory operations within a network element 110. It should be understood that more, less, and/or different tagged fields of information may be included in XML event problem report bundles 460 based on any of the detected event, the invoked script, or the identified information contained in the XML header file. In each instance, using specifically determined and descriptive tagged field names, a recipient (e.g., ICG 140 and/or BND 150) of an XML event problem report bundle 460 may quickly identify and access information associated with each specific event.

Figure 5:
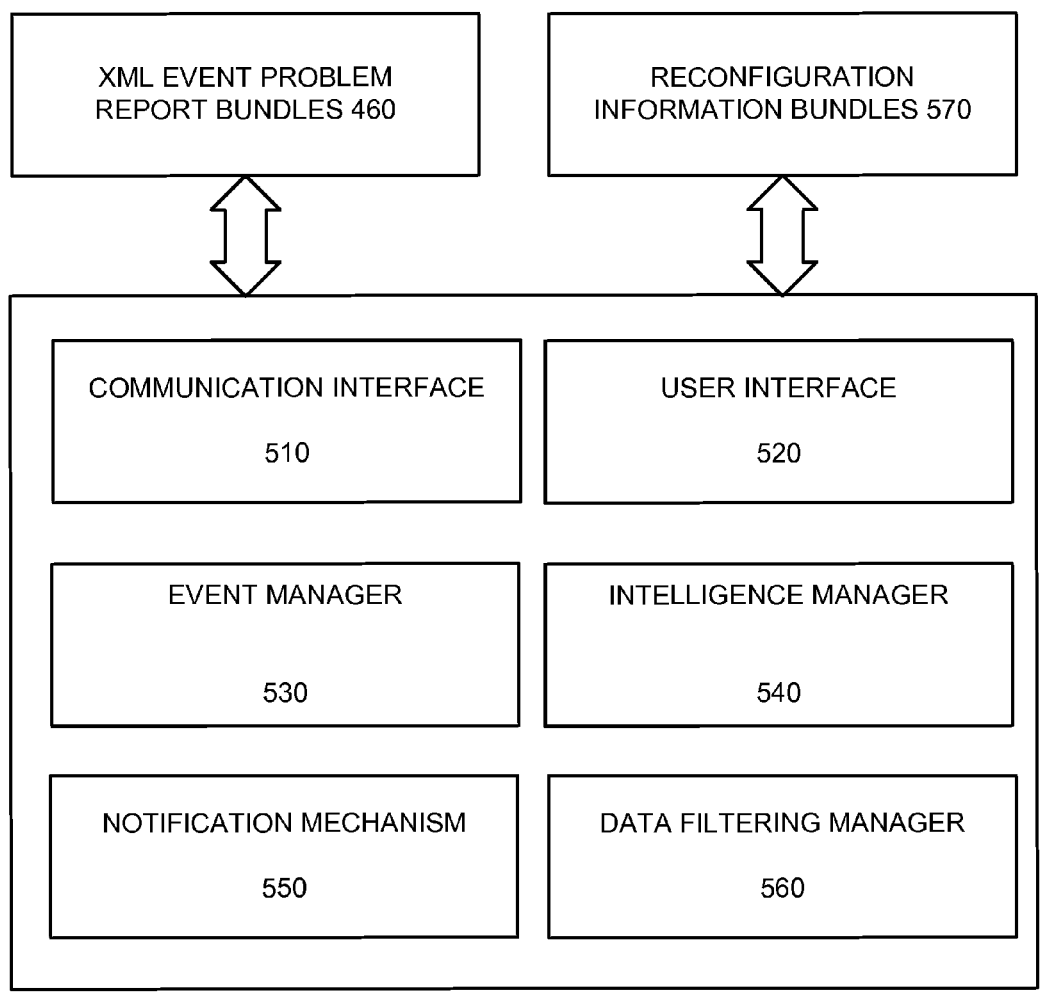
FIG. 5 is a functional block diagram of an exemplary information collection gateway (ICG) of FIG. 1.

FIG. 5 depicts a block diagram of exemplary functional components of ICG 140. As shown, ICG 140 may include a communication interface 510, a user interface 520, an event manager 530, an intelligence manager 540, a notification mechanism 550, and/or a data filtering manager 560. ICG 140 may transmit and/or receive XML event problem report bundles 460 and may transmit and/or receive reconfiguration information bundles 570. In different implementations, ICG 140 may include fewer, additional, or different components than those illustrated in FIG. 5.

Communication interface 510 may include one or more devices configured to transmit and/or receive XML event problem report bundles 460 and/or reconfiguration information bundles 570 to/from a network element 110, another ICG 140 or BND 150. For example, communication interface 510 may receive an XML event problem report bundle 460 from one of network elements 110. Communication interface 510 may extract events and information from a received XML event problem report bundle 460 for further processing within ICG 140. For example, communication interface 510 may include data mining and processing tools that may search for specifically identified events (e.g., in specific tagged fields of information, such as problem event class) contained within an XML header file. Based on the results of processing the events and information from a received an XML event problem report bundle 460, communication interface 510 may determine a protocol of and/or reformat an XML event problem report bundle 460 for communication to another device. For example, communication interface 510 may reformat and transmit an XML event problem report bundle 460 to another ICG 140 and/or backend network device 150. Communication interface 510 may also reformat and/or transmit/receive reconfiguration information bundles 570 to/from another ICG 140, a network element 110 and/or backend network device 150. Communication interface 510 is described in further detail with reference to FIG. 7.

User interface 520 may include hardware and/or software-based logic for allowing an operator to interface with ICG 140. For example, user interface 520 may include a display and/or a keyboard, with which a user may interact with data displayed via a display. User interface 520 may provide information relating to events and/or errors within a network and may allow a user to determine if a received XML event problem report bundles 460 may be transmitted to another ICG 140 or BND 150.

Event manager 530 may include hardware and/or software-based logic that may receive an identified event from communication interface 510 (extracted from a received XML event problem report bundle 460 from one of network elements 110), and may store data with a corresponding event. For example, event manager 530 may store a memory error (identified in a received XML header file) with the corresponding memory data (identified in a received XML payload file). Event manager 530 may correlate and/or store events and/or data for a number of network elements within a network. As shown in FIG. 1 for example, event manager 530 contained in ICG 140-5 may store events and/or data for all network elements 110 in networks 120-1 and 120-2.

Intelligence manager 540 may include hardware and/or software-based logic that may receive an event and/or may collect reconfiguration information (extracted from a reconfiguration information bundle 570) relating to identified events. Intelligence manager 540 may determine whether there is associated reconfiguration information (such as a software upgrade or script) to correct the error and/or event. For example, ICG 140 may obtain reconfiguration information from another ICG 140 or BND 150 and/or may associate and store this reconfiguration information with a corresponding type of error and/or event. In response to determining that an error or event is associated with stored reconfiguration information, intelligence manager 540 may provide the determined reconfiguration information to communication interface 510 to be formatted for transmission to one of network elements 110, for example. In further examples, if intelligence manager 540 receives an updated software process (e.g., from BND 150), intelligence manager 540 may transmit the new software process via a reconfiguration information bundle 570 to all network elements 110 within a network 120.

Notification mechanism 550 may include hardware and/or software-based mechanisms for notifying an operator of ICG 140 that a specific type of event and/or error has occurred, as determined from data within a received XML event problem report bundle 460. For example, notification mechanisms may include sending an email, alerting an administrator that a specifically identified type of error and/or event has occurred, etc.

Data filtering manager 560 may include hardware and/or software based mechanisms for identifying and/or filtering data to be included within XML event problem report bundles 460. For example, data filtering manager 560 may filter information received XML event problem report bundles 460 for identified types of events and types of XML event problem report bundles 460 and/or may determine if the received XML event problem report bundles 460 contain the identified type of event or type of data. For example, XML event problem report bundles 460 generated by the process described below in connection with FIG. 9 may be automatically identified and/or filtered to be transmitted to BND 150, whereas XML event problem report bundles 460 generated by the process described below in connection with FIG. 10 may be filtered to identify if they include specific types of events or errors that may be transmitted to BND 150 for further processing.

Figure 6:
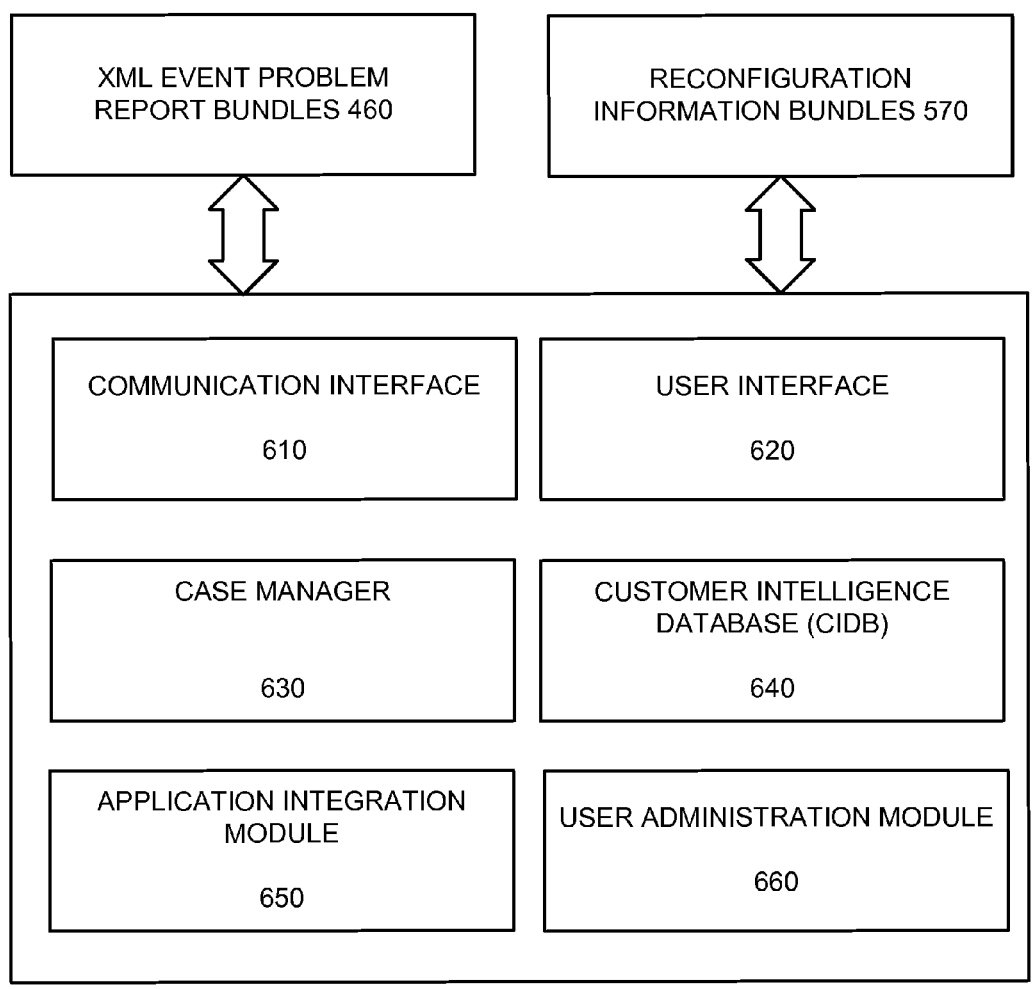
FIG. 6 is a functional block diagram of an exemplary backend network device (BND) of FIG. 1.

FIG. 6 depicts a block diagram of exemplary functional components of BND 150. As shown, BND 150 may include a communication interface 610, a user interface 620, a case manager 630, a customer intelligence database 640, an application integration module 650 and a user administration module 660. BND 150 may transmit and/or receive XML event problem report bundles 460 and/or reconfiguration information bundles 570 to/from ICG 140. In different implementations, BND 150 may include fewer, additional, or different components than those illustrated in FIG. 6.

Communication interface 610 may include one or more devices configured to receive XML event problem report bundles 460 from ICGs 140 and to transmit reconfiguration information bundles 570 to ICGs 140. For example, communication interface 610 may receive an XML event problem report bundle 460 from ICG 140-5. Communication interface 610 may extract actions, events and information from a received XML event problem report bundle 460 for further processing within BND 150. For example, actions, events and information/data may be transmitted to the appropriate components (620-660) within BND 150 for further processing. After processing the actions, events and information included in a received an XML event problem report bundle 460, communication interface 610 may create a reconfiguration information bundle 570 using a determined protocol and/or format to be sent to an ICG 140. Communication interface 610 is described in further detail with reference to FIG. 7.

User interface 620 may include hardware and/or software-based logic for allowing an operator to interface with BND 150. For example, user interface 620 may include a display and/or a keyboard, with which a user may interact with BND 150. User interface 620 may provide alerts and/or issues detected within networks 120 and/or may allow a user to display and/or analyze data included in received XML event problem report bundles 460.

Case manager 630 may include mechanisms to receive events (extracted by communication interface 610 from a received XML event problem report bundle 460) and produce a new case trouble ticket. For example, case manager 630 may include a customer relationship manager (CRM) tool that may map received events to form a new case problem ticket and a corresponding case ID. For example, information related to events, such as would be included in tagged fields (e.g., problem description, platform, time of problem, serial number, priority, severity of event, etc.) may be automatically placed into a new case problem ticket.

Customer Intelligence Database CIDB 640 may include hardware and/or software-based logic that may receive events and information from received XML event problem report bundles 460 and/or may store and analyze the data included therein. For example, CIDB 640 may identify a hardware and/or software problem, analyze data relating to the identified problem, and/or determine reconfiguration information based on the analyzed data received within an XML event problem report bundle 460. The analysis performed by CIDB 640 may include any appropriate analysis algorithm such as, for example, a decision tree or an artificial intelligence database. The specific type of analysis performed by CIDB 640 may be determined by the type of network, actions, event and/or data included within the XML event problem report bundles 460. For example, CIDB 640 may contain algorithms to perform trend analysis, detect increments of critical counter values, and measure or detect memory leaks, and may also create scripts based on the collected and analyzed data. For example, if a trend is positively identified by an algorithm, a script (reconfiguration information) may be created to reconfigure component(s) within network element 110 in order to adjust to the determined trend. If, for example, a component within network element 110 is positively identified by an algorithm within CIDB 640 as using 90% of the processor's resources, a script may be created to collect data from the identified component to further determine the nature of the problem. This script, (included in reconfiguration information bundle 570) may be transmitted from BND 150 to ICG 140 via communication interface 610.

Application integration module (APIM) 650 may include one or more mechanisms for receiving XML event problem report bundles 460 and communicating data between case manager 630 and CIDB 640.

User administration module 660 may include one or more mechanisms for allowing administrators to access information in BND 150, such as data stored in CIDB 640. For example, user administration module 660 may provide passwords for users and/or administrators, and may allow access to data, based on the user's/administrator's level of clearance.

Figure 7:
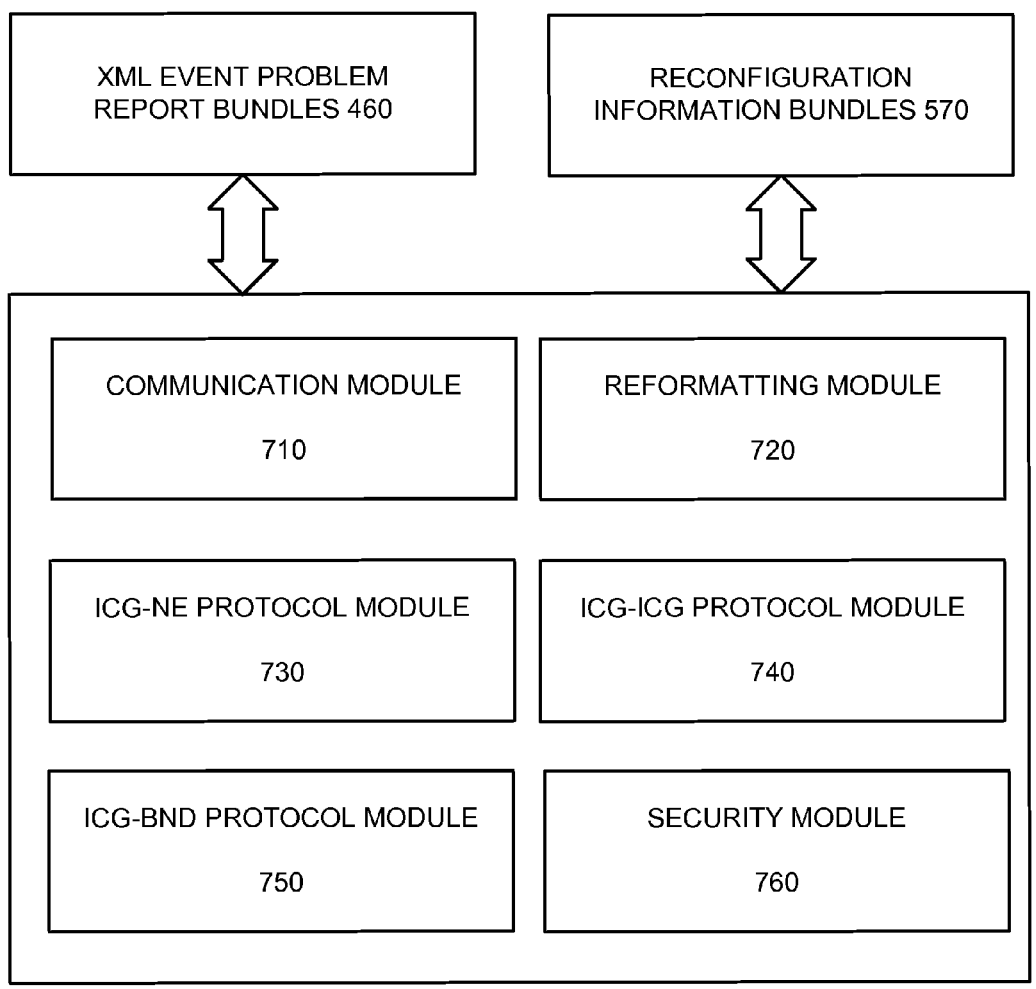
FIG. 7 is a functional block diagram of an interface within ICG and BND as shown in FIGS. 5 and 6.

FIG. 7 depicts a block diagram of exemplary functional components of communication interfaces 510 and 610 (as shown in FIGS. 5 and 6). As shown, communication interfaces 510/610 may include a communication module 710, a reformatting module 720, an ICG-NE protocol module 730, an ICG-ICG protocol module 740, an ICG-BND protocol module 750 and a security module 760. As described above, communication interfaces 510/610 may transmit/receive XML event problem report bundles 460 and reconfiguration information bundles 570. In different implementations, communication interfaces 510/610 may include fewer, additional, or different components than those illustrated in FIG. 7.

Communication module 710 may include logic that may transmit/receive XML event problem report bundles 460 and reconfiguration information bundles 570 to/from another network device. Communication module 710 may also include data mining and processing tools that may search for specifically identified events (e.g., in specific tagged fields of information, such as described above) contained within an XML header file. Communication module 710 may transmit extracted events, information, etc. to other components (modules 720-760) for further processing within communication interface 510/610 based on the determined/identified information/event, etc. For example, if a received XML event problem report bundle 460 has been received by ICG 140 from a network element 110, an event may be sent to ICG-NE protocol module 730 for further processing. If, for example, a received XML event problem report bundle 460 has been received by ICG 140 from another ICG 140, an event may be sent to ICG-ICG protocol module 740 for further processing.

Reformatting module 720 may include memories and logic to reformat information included in a received XML event problem report bundle 460 to provide a reformatted XML event problem report bundle 460. For example, reformatting module 720 may receive information (from modules 730-750) identifying formats of communications (i.e., information to be included in XML header and payload files) between network devices and format received information to be included in an XML event problem report bundles 460 and reconfiguration information bundles 570. For example, when transmitting an XML event problem report bundle 460 from one ICG 140 to another ICG 140, reformatting module 720 may receive information from ICG-ICG protocol module 740 that includes the appropriate format and fields of information for the XML header and payload files. Reformatting module 720 may also provide timestamp information into an XML header file that identifies the device (ICG 140) that received/processed the XML event problem report bundle 460 and the day/time that the XML event problem report bundle 460 was processed.

ICG-NE protocol module 730 may include hardware and/or software-based mechanisms for identifying events included within XML event problem report bundles 460 and for associating actions to be performed based on the received events. For example, an event and/or information relating to an event (that instigated the generation of XML event problem report bundle 460 by network element 110) may be associated (stored) with an action to be taken by ICG 140. For example, ICG-NE protocol module 730 may determine to search intelligence manager 540 for reconfiguration information if the event is a software error. ICG-NE protocol module 730 may determine that an action, such as notification manager 550 sending an alert message, should be performed in response to receiving a hardware error (event). Additionally, the information related to the event (that may also be included in the XML header file), such as, for example, host-event ID, service type, problem class, problem description, priority severity, problem priority, core file path, product name, host name, version information and time of event, may also be used to determine actions to be performed by components within ICG 140.

ICG-ICG protocol module 740 may include hardware and/or software based mechanisms for identifying events included within XML event problem report bundles 460 and for associating actions to be performed based on the received events. For example, an event and/or information relating to an event may be associated (stored) with action(s) to be taken by ICG 140. For example, ICG-ICG protocol module 740 may determine to search intelligence manager 540 for reconfiguration information if the event is a software error. ICG-ICG protocol module 740 may determine that an action, such as notification manager 550 sending an alert message, should be performed in response to receiving a hardware error (event). Additionally, the information related to the event (that may also be included in the XML header file), such as, for example, host-event ID, service type, problem class, problem description, priority severity, problem priority, core file path, product name, host name, version information and time of event, may also be used to determine actions to be performed by components within ICG 140. ICG-ICG protocol module 740 may also communicate format information to reformatting module 720 in order to form an XML event problem report bundle 460 to be transmitted to another ICG 140.

ICG-BND protocol module 750 may include hardware and/or software based mechanisms for identifying events included within XML event problem report bundles 460 and for associating actions to be performed based on the received events. For example, an event and/or information relating to an event may be associated (stored) with an action to be taken by ICG 140. For example, ICG-BND protocol module 750 may determine to search intelligence manager 540 for reconfiguration information if the event is a software error. ICG-BND protocol module 750 may determine that an action, such as notification manager 550 sending an alert message, should be performed in response to receiving a hardware error (event). Additionally, the information related to the event (that may also be included in the XML header file), such as, for example, host-event ID, service type, problem class, problem description, priority severity, problem priority, core file path, product name, host name, version information and time of event, may also be used to determine actions to be performed by components within ICG 140. ICG-BND protocol module 750 may also communicate format information to reformatting module 720 in order to form an XML event problem report bundle 460 to be transmitted to BND 150.

Security module 760 may include hardware and/or software-based mechanisms for identifying and/or filtering data to be included within XML event problem report bundles 460. For example, security module 760 may delete information received XML event problem report bundles 460 for identified types of confidential information. For example, for network security purposes, security module 760 may delete data, such as an IP address of a network element 110, within XML event problem report bundles 460 to ensure that no confidential information is contained within transmitted XML event problem report bundles 460. Security module 760 may also add password or login information to ensure that only appropriate network devices may receive/transmit XML event problem report bundles 460 and/or access information within the transmitted XML event problem report bundles 460.

Figure 8:
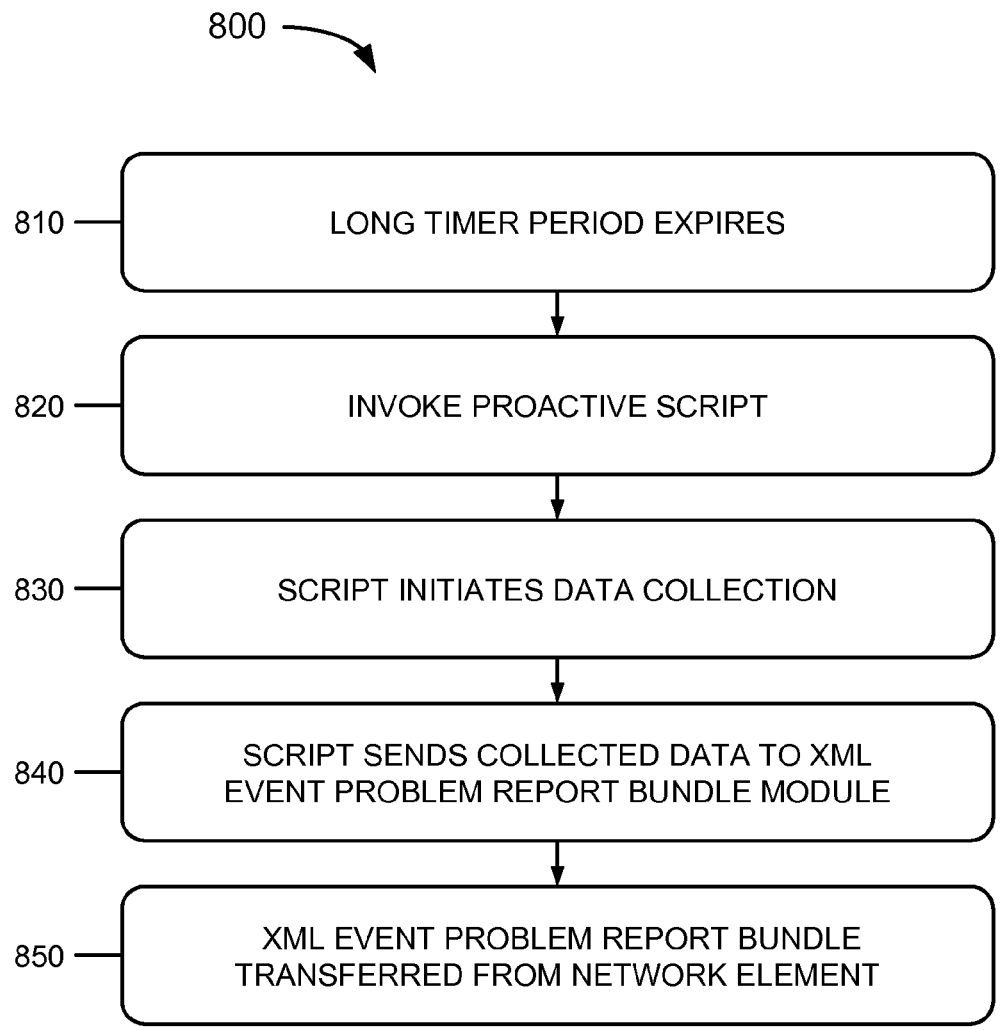
FIG. 8 is a flowchart of an exemplary proactive process.

FIG. 8 is a flowchart illustrating an exemplary proactive process 800 that may be performed in one of network elements 110. Process 800 may begin with expiration of a long timer value (block 810). For example, a timer value contained in XML event problem report bundle module 450 may expire. As described above, the timer values contained in XML event problem report bundle module 450 may be on the order of days, weeks, months, etc. Each individual timer value may include a corresponding proactive script contained in long timer based operations module 440 that is invoked upon timer expiration (block 820).

Once invoked, a proactive script may initiate data collection (block 830). For example, a script may initiate collection of data at one of interfaces 230 or an invoked script may initiate collection of data relating to the operations of processor 210. The invoked proactive script may send the collected data to XML event problem report bundle module 450 (block 840). Details of creating XML event problem report bundles 460 are described below in connection with FIG. 10.

Returning to FIG. 8, XML event problem report bundle 460 may be generated that contains the collected data that may relate to one of interfaces 230. The XML event problem report bundle 460 may be transferred to ICG 140 (block 850). For example, network element 110 may transmit an XML event problem report bundle 460 to ICG 140 for storage and analysis of the collected data. Further details of receiving and analyzing an XML event problem report bundle 460 are described below in connection with FIGS. 12 and 13.

Figure 9:
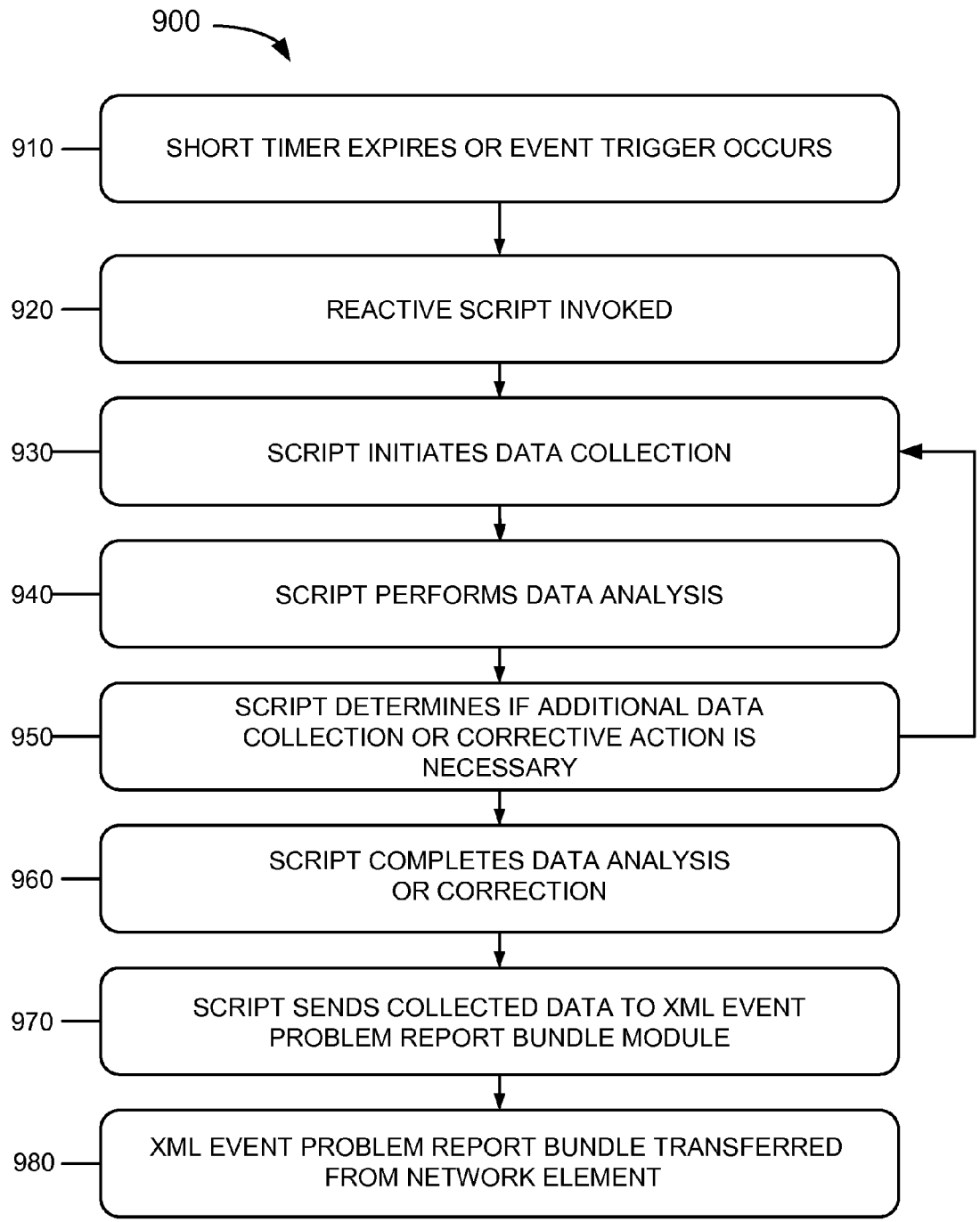
FIG. 9 is a flowchart of an exemplary reactive process.

FIG. 9 is a flowchart illustrating an exemplary reactive process 900 that may be performed in one of network elements 110. Process 900 may begin expiration of a short timer and/or occurrence of an event trigger (block 910). For example, event 410 may be received and may be compared to event policies contained in XML event problem report bundle module 450. Each event and short timer value in XML event problem report bundle module 450 may be associated with a corresponding reactive script contained in short timer based operations module 430. Upon detection of an event or time period, and association with event policies, XML event problem report bundle module 450 may invoke a reactive script contained in short timer based operations module 430 (block 920).

If invoked, a reactive script may initiate data collection (block 930). For example, received event 410 may result in invoking a reactive script contained in event trigger module 420. Received event 410 may be, for example, that 50% of memory 220 is being used, which may indicate a potential memory leak. Data may be collected relating to hardware aspects of memory 220 and data may be collected relating to software processes or operations that may currently be accessing memory 220. The data collected regarding the operation of memory 220 may be analyzed (block 940). For example, the analyzed data may indicate that hardware aspects of memory 220 are functioning properly. Other data collected by the invoked reactive script may relate to the amount of data stored in routing tables or forwarding tables contained in the routing information base (RIB). This data may be analyzed to determine if a certain portion (e.g., 50%) of memory usage is normal based on the information in the RIB.

Based on the analysis performed in block 840, the invoked script may determine if additional data collection may be necessary and/or if corrective action may be taken (block 950). Continuing with the above example, if the analysis of the data relating to the RIB indicates that the network element is currently receiving large amounts of data, a 50% memory usage may be determined to be acceptable and no corrective action may be taken, and script may complete the data analysis and/or corrective actions (block 960).

If, for example, analysis of the data indicates that a small amount of data is being received by network element 110, this may indicate that a memory leak is occurring and another reactive script may be invoked to collect data relating to other processes currently accessing memory 220 (block 950). An additionally invoked reactive script may collect and analyze data and determine that a software process is not releasing memory space within memory 220. In response to this analysis, the script may take corrective action by shutting down the detected faulty software process and/or launching another process to replace the faulty software (block 960).

The reactive script may send the collected data to XML event problem report bundle module 450 (block 970). For example, corrective actions taken and/or data collected by the invoked script may be sent to XML event problem report bundle module 450, so that an XML event problem report bundle 460 may be generated. Further details of generating an XML event problem report bundle 460 are described below in connection with FIG. 10. The generated XML event problem report bundle 460 may be transferred to ICG 140 (block 980). For example, an event problem report bundle 460 may be transferred from network element 110 to ICG 140 via network 120. Further details of receiving and processing an XML event problem report bundle 460 are described below in connection with FIGS. 12 and 13.

Figure 10:
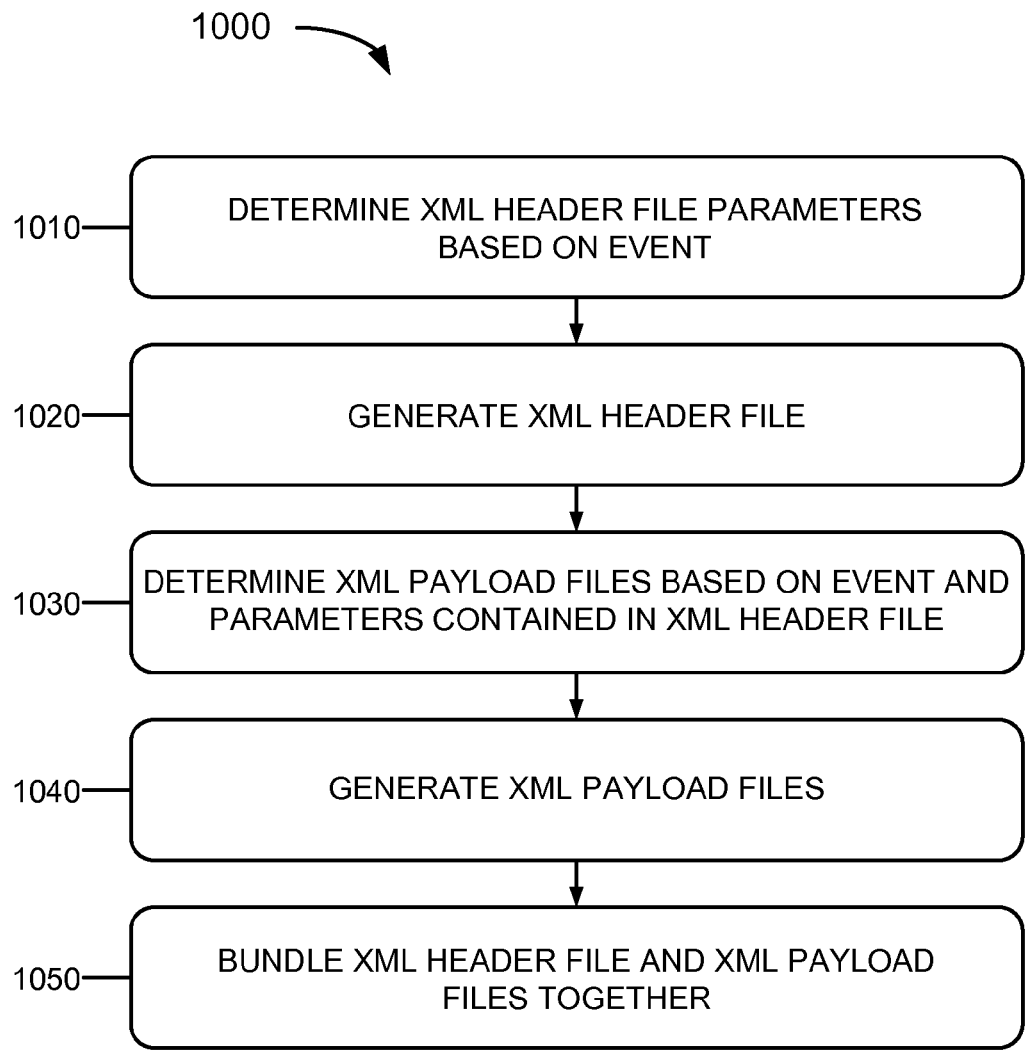
FIG. 10 is a flowchart of an exemplary process for creating Extensible Markup Language (XML) event problem report bundles.

FIG. 10 is a flowchart illustrating an exemplary XML event problem report bundle generation process 900. As mentioned above, process 1000 may be enacted in blocks 840-850 (as shown in FIG. 8) or blocks 970-980 (as shown in FIG. 9). Process 1000 may begin if XML event problem report bundle module 450 receives data collected by a script and determines an XML header file based on the event (block 1010). For example, XML event problem report bundle module 450 may receive data collected by a script invoked by an event, and, based on the invoked script associated with this event, the appropriate XML header file structure and parameters may be selected. The XML header file parameters may include tagged fields of information relating to the identified event such as, for example, host-event ID, event type, event problem class, event problem description, priority severity, problem priority, core file path, product name, host name, version information, time of event, core manifest, software stack trace, show chassis hardware, show chassis firmware, problem synopsis, etc.

After the appropriate XML header file parameters have been determined, the XML header file may be generated (block 1020). For example, the information for each determined tagged field within the header may be completed and tagged. After the XML header file has been generated, XML payload files may be determined based on the event contained in the XML header file (block 1030). For example, XML event problem report bundle module 450 may store and associate tagged fields of information that may be included in XML payload files for each type of event field in an XML header file. As described above, a software error identified in the XML header file may be associated with specific payload fields to be included in the XML payload files and a hardware failure identified in the XML header file may be associated with specific payload fields to be included in the XML payload files.

After the appropriate XML payload files have been determined, the XML payload files may be generated (block 1040). For example, information relating to the determined event problem class of the detected event may be tagged with the associated specific payload fields, to form an XML payload file. In other examples, attachment files that do not necessarily contain tagged fields, for example memory usage files, may be included in the XML payload files. If the XML payload files have been generated, XML event problem report bundle module 450 may bundle the XML header file and XML payload files together to form an XML event problem report bundle 460 (block 1050). Once bundled, the XML event problem report bundle 460 may be transmitted (as shown in blocks 850 and 980) to ICG 140. In this manner, XML event problem report bundle module 450 may provide a descriptive and flexible system of reporting events and/or errors within a network element 110. An exemplary XML event problem report bundle 460 generated by a network element 110 is shown in FIG. 11A.

Figure 11A:
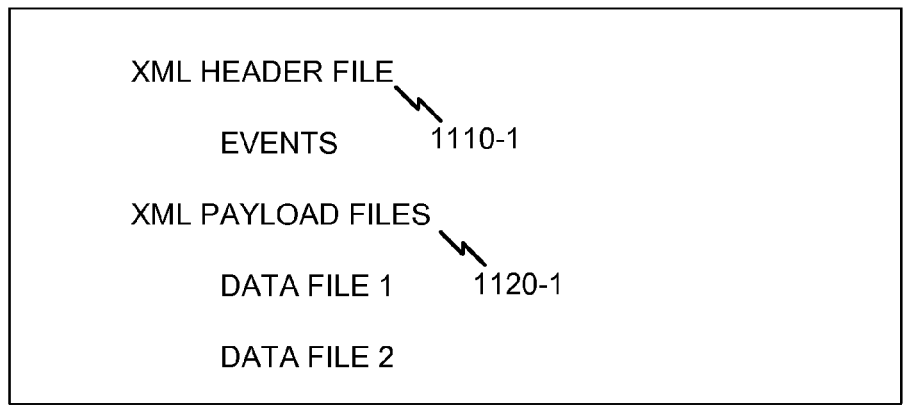
FIGS. 11A and 11B illustrate XML event problem report bundles.
Figure 11B:
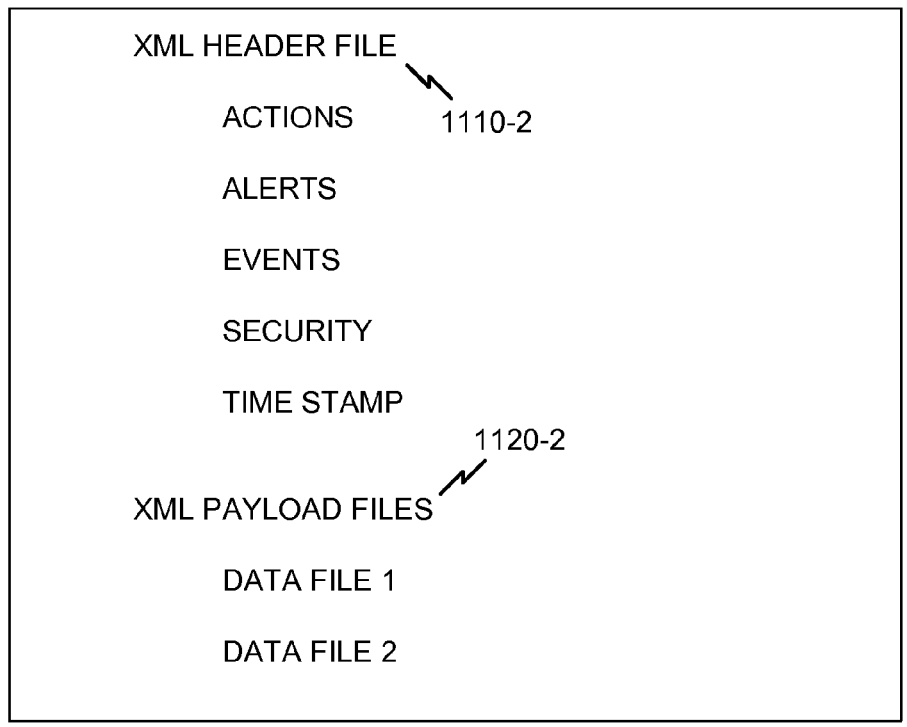

FIGS. 11A and 11B show exemplary XML event problem report bundles 460-1 to 460-3. Exemplary XML event problem report bundle 460-1 may have been generated by a network element 110, using the process described above in FIG. 10. As shown, XML event problem report bundle 460-1 may include an XML header file 1110-1 and an XML payload file 1120-1.

XML header file 1110-1 may include tagged fields of events and tagged fields of information related to the event. As described above, an event may be a hardware error, a software error or a high temperature sensor reading. The information related to the event may be included in the XML header file in tagged fields, such as, for example, host-event ID, service type, problem class, problem description, priority severity, problem priority, core file path, product name, host name, version information, time of event, core manifest, software stack trace, show chassis hardware, show chassis firmware, and/or problem synopsis.

XML payload files 1120-1 may include files of information and/or data that may be associated with an event. For example, XML payload files 1120-1 may include Data file 1 and Data file 2. As described above, the data included Data file 1 and Data file 2 may be dependent on the type of error/event and event related information included in the XML header file 1110-1. For example, if the event/error is identified as a memory leak, data included Data file 1 and Data file 2 may be statistics related to memory processes within network element 110.

FIG. 11B shows exemplary XML event problem report bundles 460-2 and 460-3. Exemplary XML event problem report bundle 460-2 may have been generated by ICG 140 after receiving exemplary XML event problem report bundle 460-1, using the process described below in FIG. 12. Similarly, XML event problem report bundle 460-3 may be generated by the process as described below in FIG. 12. As shown, XML event problem report bundles 460-2 and 460-3 may include an XML header file 1110-2 and an XML payload file 1120-2.

XML header file 1110-2 may include tagged fields of events and tagged fields of information related to the event, as described above. XML header file 1110-2 may also include additional tagged fields of information, such as, actions, alerts, timestamp and security, after being processed by ICG 140 as described below with reference to FIG. 12.

XML payload files 1120-2 may include files of information and/or data that may be associated with an event. For example, XML payload files 1120-2 may include Data file 1 and Data file 2. As described above, the data included Data file 1 and Data file 2, may be dependent on the type of error/event included in the XML header file 1110-2. Data within XML payload files 1120-2 may remain the same as was received (as 1120-1 in XML event problem report bundle 460-1).

Figure 11C:
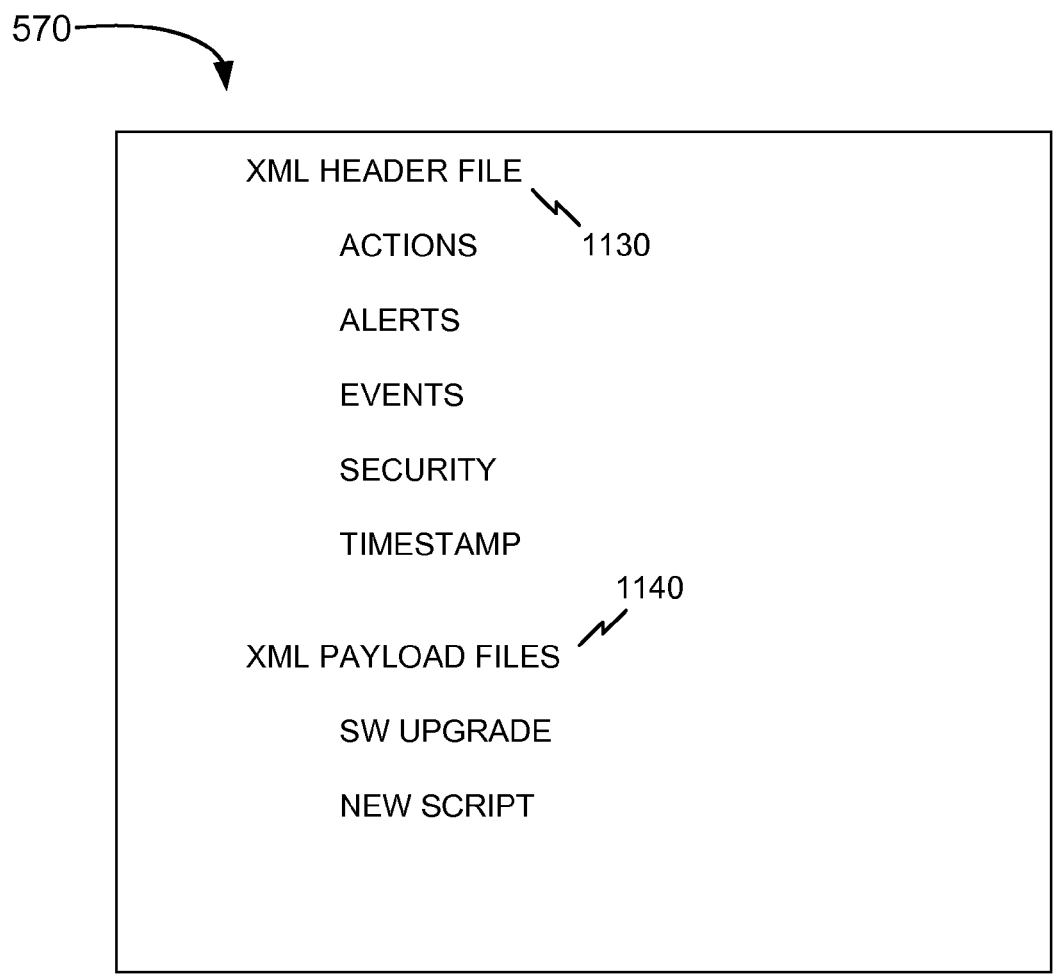
FIG. 11C illustrates an reconfiguration information bundle.

FIG. 11C shows an exemplary reconfiguration information bundle 570. Exemplary reconfiguration information bundle 570 may have been generated by an ICG 140 or BND 150 after receiving exemplary XML event problem report bundle 460-2, using the process described below in FIG. 12. As shown, reconfiguration information bundle 570 may include an XML header file 1130 and an XML payload file 1140. XML header file 1130 may include tagged fields of information, such as, actions, alerts, events timestamp and security, as described above. XML payload file 1140 may include reconfiguration information such as, for example, a software upgrade and a new script.

Figure 12:
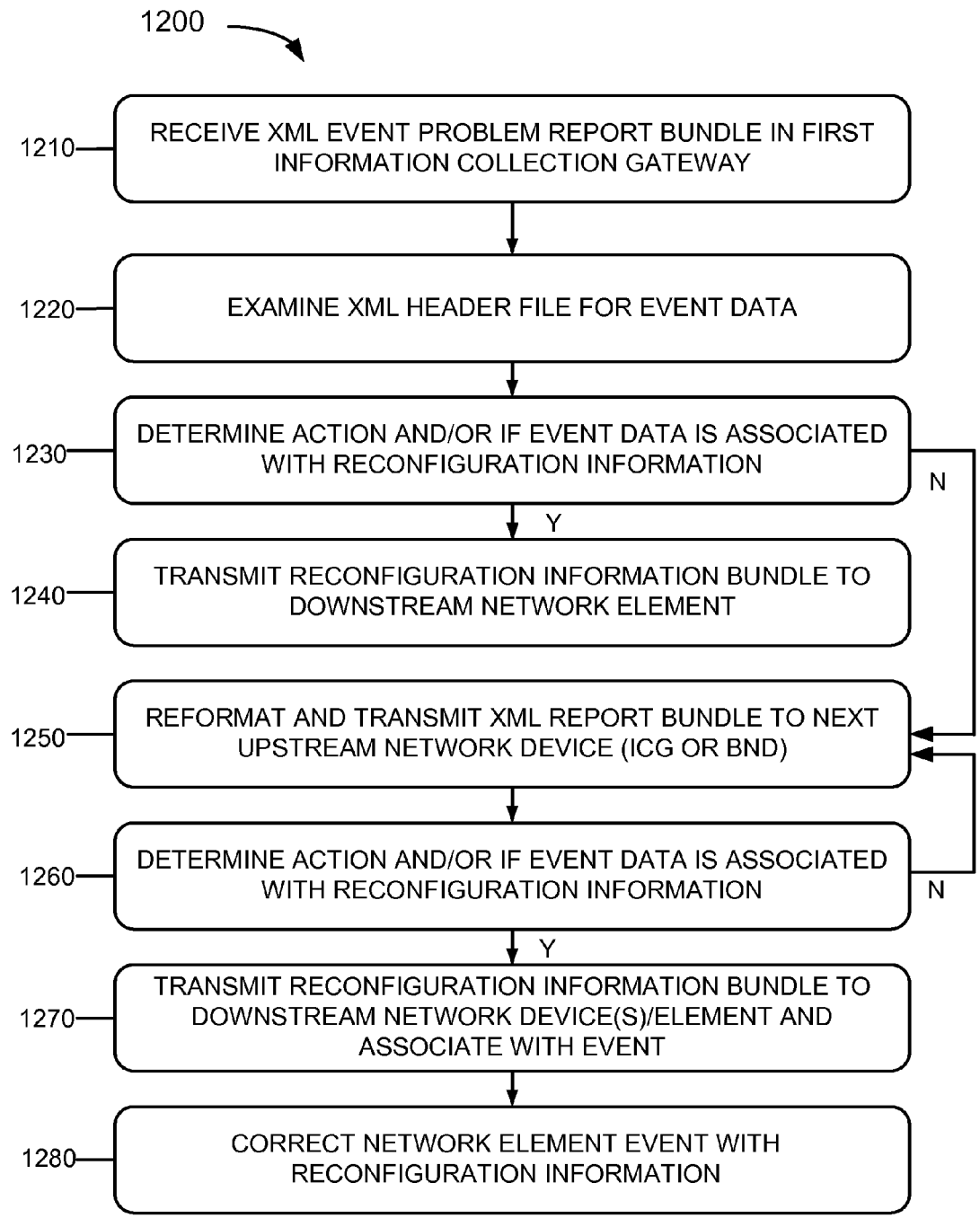
FIGS. 12 and 13 are flowcharts of exemplary processes for receiving and processing an XML event problem report bundle.

FIG. 12 is a flowchart illustrating an exemplary process 1200 for receiving an XML event problem report bundle 460. Process 1200 may begin when an XML event problem report bundle 460 is received by a first ICG 140 (block 1210). As shown in FIG. 1 for example, ICG 140-2 may receive an XML event problem report bundle 460-1 (as shown in FIG. 11A) generated and transmitted from network element 110 included in network 120-2. After being received by ICG 140 the XML header file 1110-1 may be examined to determine the event data corresponding to an event (block 1220). For example, communication interface 510 may include data mining and processing tools that may search for specifically identify events (e.g., in specific tagged fields of information, such as problem event class) contained within an XML header file 1110-1. As described above in FIG. 7, as the received XML event problem report bundle 460-1 was transmitted from network element 110, ICG-NE protocol module 730 (contained within communication interface 510) may identify the events within XML header file 1110-1 (block 1220).

Based on the event data contained in the XML header file 1110-1, an action and/or if reconfiguration information may be associated with the identified event are determined (block 1230). For example, ICG-NE protocol module 730 may associate actions (to be performed by ICG 140-2) based on the identified events within XML header file 1110-1 (block 1230). For example, if the event is an error, the associated action may be to search for reconfiguration information to solve the error. Communication interface 510 may then transmit the identified the events/actions to other components (as shown in FIG. 5) to process the identified events/actions within ICG 140-2. For example, intelligence manager 540 may store and/or associate reconfiguration information, such as a software upgrade, with corresponding events. As shown in FIG. 1 for example, intelligence manager 540 included in ICG 140-2 may contain event information gathered from previously received XML event problem report bundles 460 transmitted from any number of network elements 110 included in network 120-2. Associated with each type of event, intelligence manager 540 may store reconfiguration information that may have been previously transmitted from an upstream network device (i.e., ICG 140-5 or BND 150).

Additional processing and/or actions performed in block 1230 may also include notifying an operator and displaying the event information (contained within the received XML event problem report bundle 460-1). For example, ICG 140-2 may be configured (via user interface 520) to automatically check for specific events/errors and/or a tagged problem severity field. In one example, if the information in the problem severity field is a "5" (where severity is ranked from 1 to 5, with 5 being the highest value), the event and/or information in the received XML event problem report bundle 460-1 may be displayed. ICG 140-2 may also instigate another action, such as sending an alert email (e.g., via notification manager 550), in response to the determination that a specific event/error has occurred (in block 1230).

After ICG 140-2 has performed the actions determined by the identified event, when it is determined that reconfiguration information is associated with the identified event (Yes-in block 1230), the reconfiguration information may be transmitted to the downstream network element 110 via reconfiguration information bundle 570 (block 1240). For example, if intelligence manager 540 has an updated software process stored and associated with an event related to an interface failure, and a received XML event problem report bundle 460 contains information identifying the specific type of interface failure, the updated software process (reconfiguration information) may be transmitted via a reconfiguration information bundle 570 to network element 110 from ICG 140 (block 1240). The updated software process included in the received reconfiguration information bundle 570 (as shown in FIG. 11C) may then be used to reconfigure network element 110 and process 1200 may end.

After ICG 140-2 has performed the actions determined by the identified event, when it is determined that the identified event received in the XML event problem report bundle 460-1 is not associated with reconfiguration information (No-in block 1230), XML event problem report bundle 460-1 may be reformatted and transmitted to a next upstream network device (block 1250). As shown in FIG. 1 for example, when it is determined that ICG 140-2 does not contain stored reconfiguration information associated with the received event, ICG 140-2 may transmit the reformatted XML event problem report bundle 460-2 to ICG 140-5 for further analysis and/or processing.

As shown in FIG. 11B for example, a reformatted XML event problem report bundle 460-2 may include XML header file 1110-2, which contains additional information added by ICG 140-2. For example, modules 710-760 (within communication interface 510 of ICG 140-2) may process and reformat data included in the originally received XML event problem report bundle 460-1 to produce reformatted XML event problem report bundle 460-2. For example, ICG-ICG protocol module 740 may insert additional fields of information, such as actions and alerts in the XML header file 1110-2, (based on the identified event also included in XML header file 1110-2) so ICG 140-5 may further process the identified actions. Security module 760 may add security information in a security field, and as described above, may delete or mask confidential information within the reformatted XML event problem report bundle 460-2. For example, security module 760 may delete an IP address of the network element 110 (that originally generated the XML event problem report bundle 460-1) before transmission to ICG 140-5. Reformatting module 720 may include timestamp information (including information identifying ICG 140-2) within XML header file 1110-2 in order to identify/track the path of an XML event problem report bundle 460 as it is transmitted upstream from network device to network device.

Upon reception of a received XML event problem report bundle 460, the next upstream network device (ICG 140-5 in this example) may determine an action and/or whether the received event is associated with reconfiguration information (block 1260). For example, ICG-ICG protocol module 740 may associate actions (to be performed by ICG 140-5) based on the identified events within XML header file 1110-2 (block 1260). Additionally, the actions inserted in XML header file 1110-2 may instigate actions to be performed by ICG 140-5. For example, if the event is a specific hardware error, the associated action may be to search for reconfiguration information to solve the identified software error. Communication interface 510 may then transmit the identified the events/actions to other components (as shown in FIG. 5) to process the identified events/actions within ICG 140-5. For example, intelligence manager 540 may store and/or associate reconfiguration information, such as a software upgrade, with a corresponding software errors/events. As shown in FIG. 1 for example, intelligence manager 540 included in ICG 140-5 may contain event information gathered from previously received XML event problem report bundles 460 transmitted from any number of network elements 110 included in networks 120-1 and 120-2. Associated with each type of event, intelligence manager 540 may store reconfiguration information that may have been previously transmitted from an upstream network device (i.e., BND 150).

After ICG 140-5 has performed the actions determined by the identified event, when ICG 140-5 determines that reconfiguration information is stored and associated with the received event (Yes-in block 1260), reconfiguration information may be transmitted to ICG 140-2 (block 1270). For example, reconfiguration information bundle 570 (as shown in FIG. 11C) that includes a software upgrade in XML payload file 1120-2 may be transmitted to ICG 140-2. Upon reception of this reconfiguration information bundle 570, ICG 140-2 may store and associate the reconfiguration information with the event data (in intelligence manager 540). ICG 140-2 may then also transmit reconfiguration information to network element 110 network 120-2 (block 1270). The received reconfiguration information may then be used to correct the event or error that occurred within network element 110 (block 1280).

As process 1200 may be performed any number of times, for any number of different events, intelligence manager 540 included in downstream ICGs 140 may continue to store and associate events with reconfiguration information. In this manner, ICG 140-5 may now be configured to correct an event received from ICG 140-1 (included in network 120-1) using reconfiguration information stored and associated with an event received from network 120-2. In this manner, downstream network devices may constantly receive and update reconfiguration information in order to reduce analysis and/or processing needed from upstream network devices, for example.

After ICG 140-5 has performed the actions determined by the identified event, when reconfiguration information is not associated with the received event (No-in block 1260), XML event problem report bundle 460-2 may be reformatted and transmitted to the next upstream network device (BND 150 in this example) via another XML event problem report bundle 460-3 (block 1250). For example, ICG-BND protocol module 750 may delete, modify and/or insert additional fields of information, such as actions and alerts into an XML header file 1110, for example, based on the identified event still included in XML header file 1110-2, so BND 150 may further process the identified actions. For example, ICG-BND protocol module 750 may also add an action such as a user connection request into XML header file 1110-2. Security module 760 may add security information in a security field, and as described above, may delete or mask confidential information within the reformatted XML event problem report bundle 460-3. For example, security module 760 may delete information inserted by ICG 140-2 before transmission from ICG 140-5 to BND 150. Reformatting module 720 may include timestamp information (including information ICG 140-5) within XML header file 1110-2 in order to identify/track the path of an XML event problem report bundle 460-3 as it is transmitted upstream to BND 150.

Although not shown, there may be any number of additional networks 120/130 between a network element 110 and BND 150, for example. When this is the case, process 1200 may continue to enact blocks 1250 and 1260 recursively (reformatting and adding timestamp information, etc.) until an ICG 140 determines that reconfiguration information is stored and associated with the event received in the XML event problem report bundle 460. Continuing with this example, if no ICG 140 stores reconfiguration information associated with the event received in the XML event problem report bundle 460, the XML event problem report bundle 460 may finally be received at BND 150 (to be processed as described below in FIG. 13).

Figure 13:
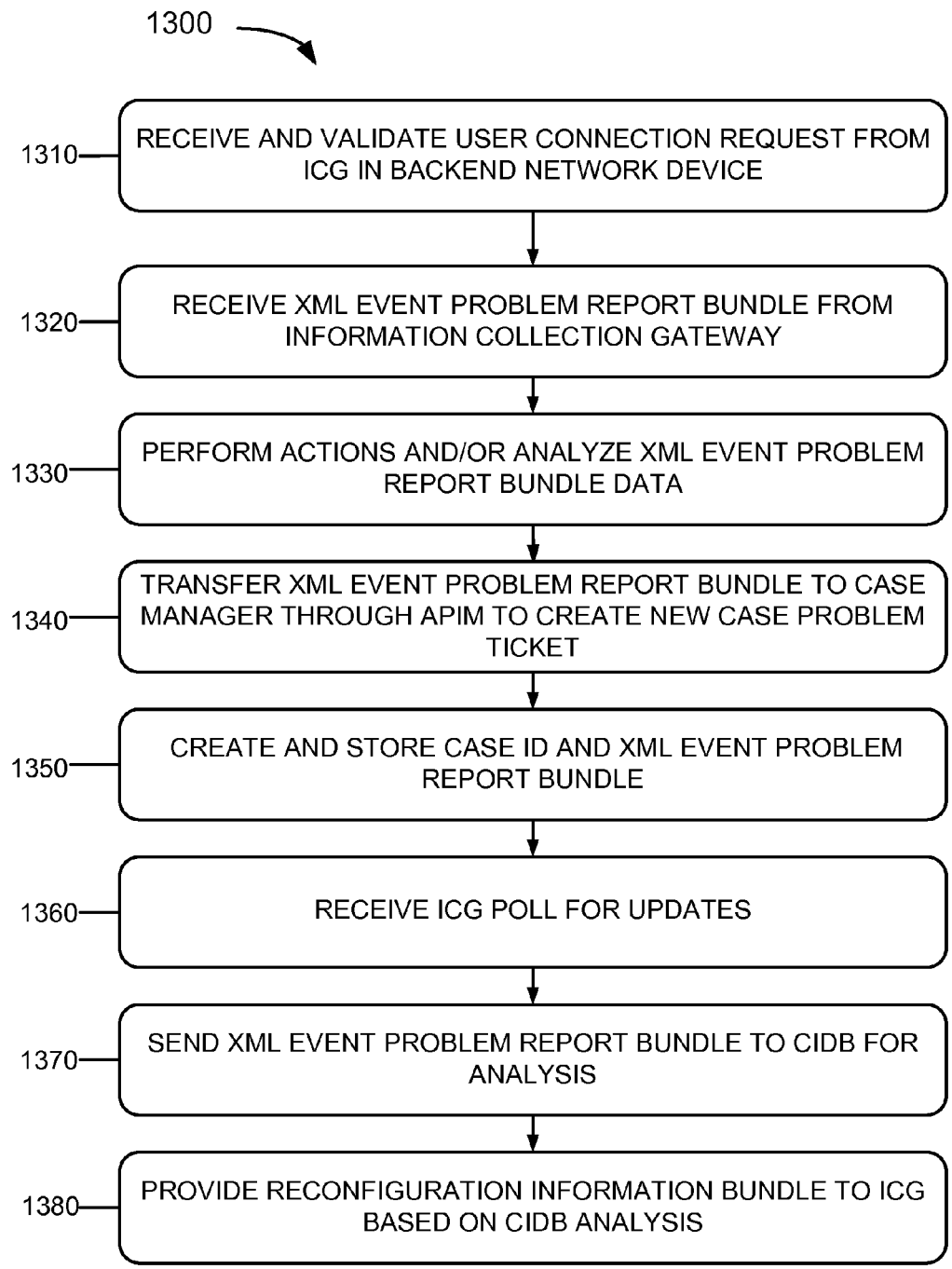

FIG. 13 is a flowchart illustrating an exemplary process 1300 for receiving and processing an XML event problem report bundle 460 in BND 150. Process 1300 may begin when BND 150 receives and validates a user connection request (block 1310). For example, ICG 140-5 may transmit an XML event problem report bundle 460-3 to BND 150, where information in the received XML header file 1110-2 may include a user connection request action and security and timestamp information that may identify a particular network or identify a particular ICG 140. Upon confirmation and validation of the user connection request by ICG-BND protocol module 750, the XML event problem report bundle 460 transmitted from ICG 140 may be received by BND 150 (block 1320). After being received by BND 150, the XML header file 1110-2 may be examined to determine events and actions to be performed by BND 150. For example, communication interface 610 may include data mining and processing tools that may search for specifically identify events (e.g., in specific tagged fields of information, such as problem event class) contained within an XML header file 1110-2. As described above in FIG. 7, as the received XML event problem report bundle 460-3 was transmitted from ICG 140-5, ICG-BND protocol module 750 (contained within communication interface 610) may identify the events and actions within XML header file 1110-2.

After receiving the XML event problem report bundle 460, BND 150 may perform actions and/or analyze event data (block 1330). For example, BND 150 may contain information gathered from previously received XML event problem report bundles 460 (from a number of different networks, such as networks 120-1 to 120-4, as shown in FIG. 1) and may determine and associate a new software process or script based on the analyzed data. For example, upon analysis of the data within an XML event problem report bundle 460, BND 150 may determine that a software process contained in a network element 110 is more than one year old and a new updated software process (reconfiguration information) may correct an event that occurred within a network element 110.

After analyzing the data, the XML event problem report bundle 460 may be transmitted through the APIM 650 to case manager 630 to create a new case problem ticket (block 1340). Case manager 630 may create and store a case ID and store the received XML event problem report bundle 460 (block 1350). For example, case manager 630 may contain a customer relationship manager (CRM) tool that may directly map to and extract information contained in the XML header file in order to form a new case problem ticket. For example, information contained in tagged fields, such as for example, event problem description, platform, time of problem, serial number, priority, severity of event, may be automatically extracted and a placed into a new case problem ticket. Further, using a CRM tool contained in case manager 630 allows for tagged fields to be specifically identified for each different customer. As shown in FIG. 1 for example, one managing service provider using network 130-1 (such as "company D") may be concerned with one type of tagged error field that commonly occurs within it's managed networks 120-1 and 120-2. A second managing service provider using network 130-2 (such as "company E") may be concerned with another type of tagged error field that commonly occurs within it's managed networks 120-3 and 120-4. In this manner, case manger 630 may "customize" new case problem tickets for each different customer.

After creating a case ID and new case problem ticket, BND 150 may receive a poll from ICG (block 1360). As shown in FIG. 1 for example, ICG 140-6 may periodically poll BND 150 for updated information relating to the created case ID. If BND 150 has determined a software solution or new script, this reconfiguration information may be obtained by ICG 140-6 via a reconfiguration information bundle 570 as shown in FIG. 11C.

BND may continue to process data received in an XML event problem report bundle by sending the XML event problem report bundle to CIDB 640 for analysis (block 1370). For example, the analysis performed by CIDB 640 may include any appropriate analysis algorithm such as, for example, a decision tree or an artificial intelligence database. The specific type of analysis performed by CIDB 640 may be determined by the type of network, error and/or data contained within XML event problem report bundle 460. CIDB 640 may contain algorithms to perform trend analysis, detect increments of critical counter values and measure or detect memory leaks, and may also create new software processes and/or scripts based on the collected and analyzed data. For example, if a trend is positively identified by CIDB 640, an additional script (reconfiguration information 570) may be created to reconfigure component(s) within network element 110 in order to adjust to the determined trend. In another example, if a specific software process is identified as potentially faulty by CIDB 640, a new script (reconfiguration information) may be created that contains new parameters to monitor within a network element 110.

In response to further ICG 140 polls, BND 150 may provide reconfiguration information bundles 570 to ICG 140 based on the analyzed data (block 1380). As described above, the reconfiguration information determined and produced by CIDB 640 may be obtained by ICG 140. For example, reformatting module 720 may receive a new script (from CIDB 640) and may receive information from ICG-BND protocol module 750 and produce a reconfiguration information bundle 570 (as shown in FIG. 11C). Once obtained by ICG 140, network elements 110 may receive the appropriate reconfiguration information via a reconfiguration information bundle 570 in order to correct (or proactively avoid) errors.

As BND 150 may receive XML event problem report bundles 460 from a plurality of network elements 110 within a plurality of different networks (such as networks 120-1 to 120-4 as shown in FIG. 1), BND 150 may determine and proactively compensate for trends or tendencies within network elements 110 that may be undetectable by existing systems.

Therefore the exemplary systems and processes described above may provide an intelligent, descriptive, and/or flexible manner of interfacing and communicating event data upstream and downstream through a number of network devices. Further, the systems and processes described may provide automatic analysis of errors and provide reconfiguration information that may be used to avoid errors in a network element 110 before they occur.

The foregoing description of implementations provides an illustration, but is not intended to be exhaustive or to limit the implementations to the precise form disclosed. Modifications and variations are possible in light of the above teachings or may be acquired from practice of the teachings.

In addition, while series of blocks have been described with regard to the processes illustrated in FIGS. 8-10, 12 and 13, the order of the blocks may be modified in other implementations. Further, non-dependent blocks may represent blocks that can be performed in parallel. For example, blocks 1210-1280 that are performed for one received XML event problem report bundle 460 may be independent of blocks 1210-1280 for a second received XML event problem report bundle 460, and therefore, may be performed in parallel. Also, it may be possible to omit blocks within a process.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the embodiments. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   memory to store instructions, where the device is a first device; and
   a processor to execute the instructions to:
   receive a first message and a second message from a second device, where the first message and the second message differ, and where the first message includes a first header and first event data and the second message includes a second header and second event data,
   identify, based on the first header and the second header, that the first message and the second messages are problem reports,
   process, in response to identifying the first message and the second messages as the problem reports, the first event data to determine that the first event data, in the first message, is associated with a particular reconfiguration information, of a plurality of reconfiguration information corresponding with the second device,
   process, in response to identifying the first message and the second messages as the problem reports, the second event data to determine that the second event data in the second message is not associated with any of the plurality of reconfiguration information,
   transmit the particular reconfiguration information to the second device in response to the first message,
   determine additional information based on processing the second event data,
   form, based on processing the second event data, a reformatted second message, including the adding additional information to the second message, and
   transmit the second reformatted problem report to a third device.

2. The device of claim 1, where the processor, when processing the first event data, is further to:
   identify, based on the first event data, a first type of event that occurred in the second device that led to generation of the first message; and
   determine the reconfiguration information based on the identified first type of event that occurred in the second device.

3. The device of claim 1, where the processor, when determining the additional information, is further to:
   identify, based on the second event data, a second type of event that occurred in the second device that led to generation of the second message; and
   determine the additional information based on the identified second type of event that occurred in the second device.

4. The device of claim 3, where the information added to the reformatted second message, based on the identified second type of event, includes an alert, to the third device, related to the identified second type of event at the second device.

5. The device of claim 1, where the processor, when determining the additional information, is further to:
   identify the additional information based on an attribute of the third device that receives the reformatted second message.

6. The device of claim 1, where the additional information includes an action to be performed by the third device in response to the receiving the reformatted second message.

7. The device of claim 1, where the processor, when forming the reformatted problem report, is further to:
   identify confidential data in the second message; and
   filter out the confidential data in the reformatted second message prior to transmitting the reformatted second message to the third device.

8. The device of claim 1, where the reconfiguration information includes at least one of a software process or a script associated with the second event data.

9. A method, performed by a device, the method comprising:
   associating one of an action or reconfiguration information with each of a plurality of event data types;
   receiving a first message from a first device, where the first message includes a first problem report that includes a first type of event data, of the plurality of event data types, where the first type of event data is associated with a particular action;
   receiving a second message from the first device, where the second message includes a second problem report that includes a second type of event data, of the plurality of event data types, where the second type of event data is associated with a particular reconfiguration information;

forming a third problem report based on the first message, where the third problem report includes an indication of the first type of event data, from the first report, and the particular action associated with the first type of event data from the first message;

transmitting the third problem report to a second device;

forming a fourth problem report based on the second message, where the fourth problem report includes an indication of the second type of event data, from the second report, and the particular reconfiguration information associated with the second type of event data from the second message; and transmitting the fourth problem report to the first device.

10. The method of claim 9, where forming the third problem report further includes:

including security information and timestamp information, associated with the first message, in the third problem report.

11. The method of claim 9, where the third problem report includes information to enable the second device to perform the particular action associated with the first type of event data included in the first message.

12. The method of claim 11, where the second device is associated with a customer intelligence database, and where the particular action includes:
analyzing data from the third problem report, and
storing the analyzed data, from the third problem report, in the customer intelligence database.

13. The method of claim 9, where the particular action includes:

determining, by the second device, another reconfiguration information associated with the first device and the first type of event data from the first message, where the reconfiguration information includes at least one of a software process or a script; and forwarding, from the second device, the other reconfiguration information to the first device.

14. The method of claim 13, where the reconfiguration information includes data to correct an event that occurred in the first device, where the first type of event data is associated with the event.

15. The method of claim 13, where the second device is associated with a vendor of the first device.

16. A non-transient memory device comprising instructions executable by a processor of a device, the instructions including:

one or more instructions to receive a first message from a downstream device;

one or more instructions to identify events included in the first message;

one or more instructions to store and associate at least one of reconfiguration information, an action, or an alert with an identified event included in the first message;

one or more instructions to form a second message, where the second message includes the identified event from the first message and the at least one of the reconfiguration information, the action, or the alert associated with the identified event;

one or more instructions to transmit the second message that includes at least one of the action or the alert to an upstream device when there is no reconfiguration information associated with the identified event included in the second message; and one or more instructions to transmit the second message to the downstream device when there is reconfiguration information associated with the identified event included in the second message.

17. The non-transient memory device of claim 16, where the one or more instructions to form a second message include:

one or more instructions to filter out confidential data included in the first message.

18. The non-transient memory device of claim 16, where the one or more instructions to form a second message include:

one or more instructions to include security information and timestamp information, associated with the first message, in the second message.

19. The non-transient memory device of claim 16, where the one or more instructions to transmit the second message include:

one or more instructions to receive, from the upstream device, the reconfiguration information; and one or more instructions to forward, to the downstream device, the received reconfiguration information from the upstream device.

20. The non-transient memory device of claim 16, where the instructions further include:

one or more instructions to determine the reconfiguration information based on the identified event from the first message.

* * * * *